(12) United States Patent
Dopker et al.

(10) Patent No.: US 8,939,406 B2
(45) Date of Patent: Jan. 27, 2015

(54) JOINING COMPOSITE FUSELAGE SECTIONS ALONG WINDOW BELTS

(75) Inventors: Bernhard Dopker, Bellevue, WA (US); Wallace Chi-Hua Chan, Bothell, WA (US); Henri Michael Ostroff, Seattle, WA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 13/540,005

(22) Filed: Jul. 2, 2012

(65) Prior Publication Data

US 2014/0001311 A1    Jan. 2, 2014

(51) Int. Cl.
*B64C 1/00* (2006.01)
(52) U.S. Cl.
USPC .......................................... 244/120; 244/119
(58) Field of Classification Search
USPC ...................... 244/120, 119, 129.3
See application file for complete search history.

(56) References Cited

U.S. PATENT DOCUMENTS

| | | | |
|---|---|---|---|
| 1,368,428 A * | 2/1921 | Gilmore | 244/120 |
| 4,450,661 A | 5/1984 | Whitener | |
| 5,429,326 A | 7/1995 | Garesche et al. | |
| 7,118,069 B2 * | 10/2006 | Novak et al. | 244/119 |
| 7,325,771 B2 | 2/2008 | Stulc et al. | |
| 7,438,263 B2 | 10/2008 | Rassaian et al. | |
| 7,527,222 B2 * | 5/2009 | Biornstad et al. | 244/120 |
| 7,530,531 B2 | 5/2009 | Wood et al. | |
| 7,735,779 B2 * | 6/2010 | Griess et al. | 244/119 |
| 7,802,413 B2 | 9/2010 | Wood et al. | |
| 7,823,362 B2 * | 11/2010 | Meyer | 52/713 |
| 7,823,832 B2 | 11/2010 | Wood et al. | |
| 7,861,970 B2 * | 1/2011 | Griess et al. | 244/120 |
| 7,967,250 B2 * | 6/2011 | Lobato et al. | 244/119 |
| 8,038,099 B2 * | 10/2011 | Anast et al. | 244/119 |
| 8,061,035 B2 * | 11/2011 | Stulc et al. | 29/897.2 |
| 8,240,607 B2 * | 8/2012 | Pahl | 244/120 |
| 8,616,500 B2 * | 12/2013 | Kismarton | 244/129.3 |
| 2006/0080914 A1 | 4/2006 | Wood et al. | |
| 2006/0118676 A1 | 6/2006 | Novak et al. | |
| 2007/0069079 A1 | 3/2007 | Rassaian et al. | |
| 2008/0111026 A1 | 5/2008 | Stulc et al. | |
| 2012/0056037 A1 * | 3/2012 | Dolzinski et al. | 244/119 |

* cited by examiner

*Primary Examiner* — Christopher P Ellis
(74) *Attorney, Agent, or Firm* — Yee & Associates, P.C.

(57) ABSTRACT

A fuselage having a longitudinal window belt has a composite outer skin including upper and lower composite skin sections. The skin includes at least one window opening located at the window belt. The upper and lower skin sections are joined together by a longitudinal splice joint located at the window belt.

45 Claims, 21 Drawing Sheets

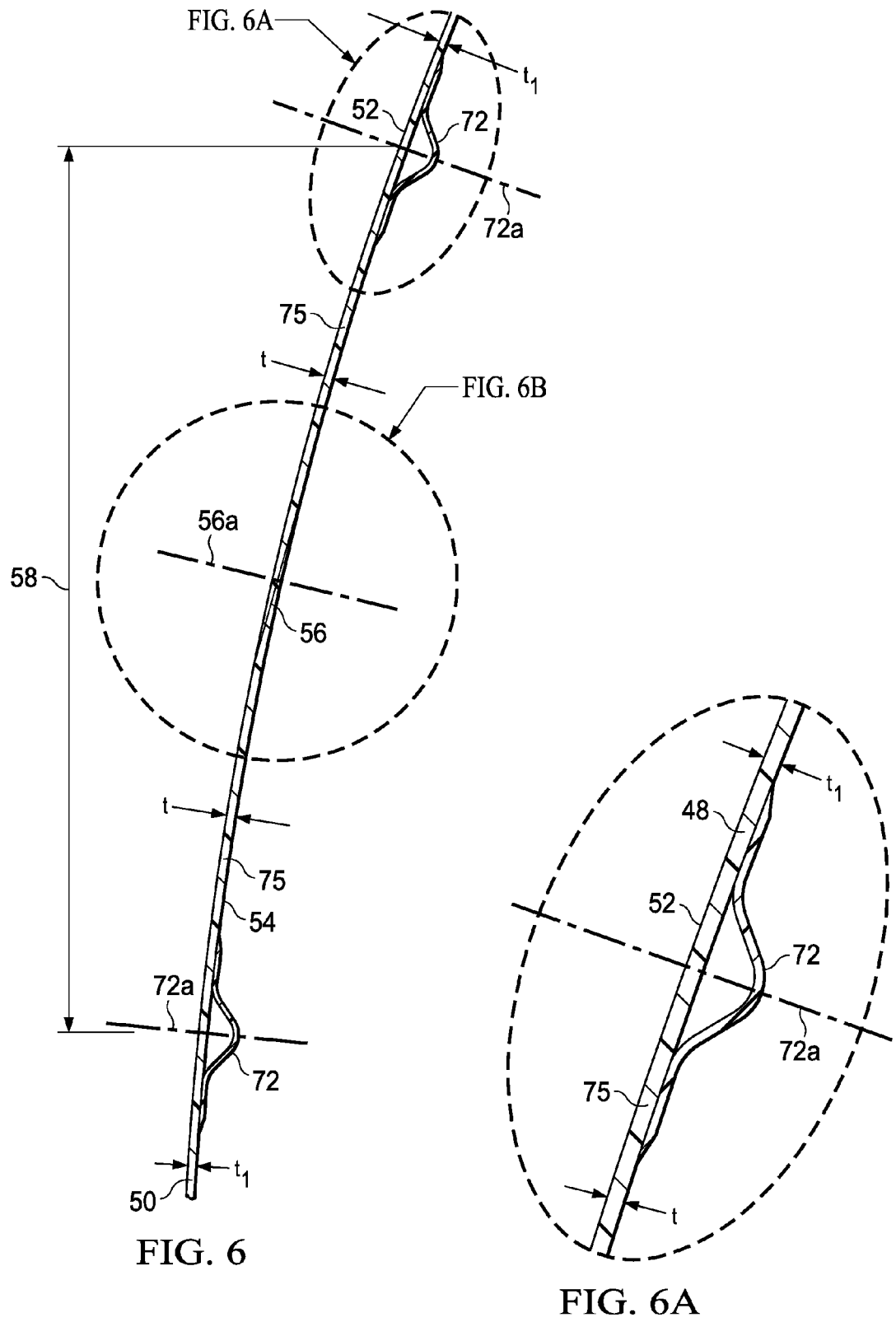

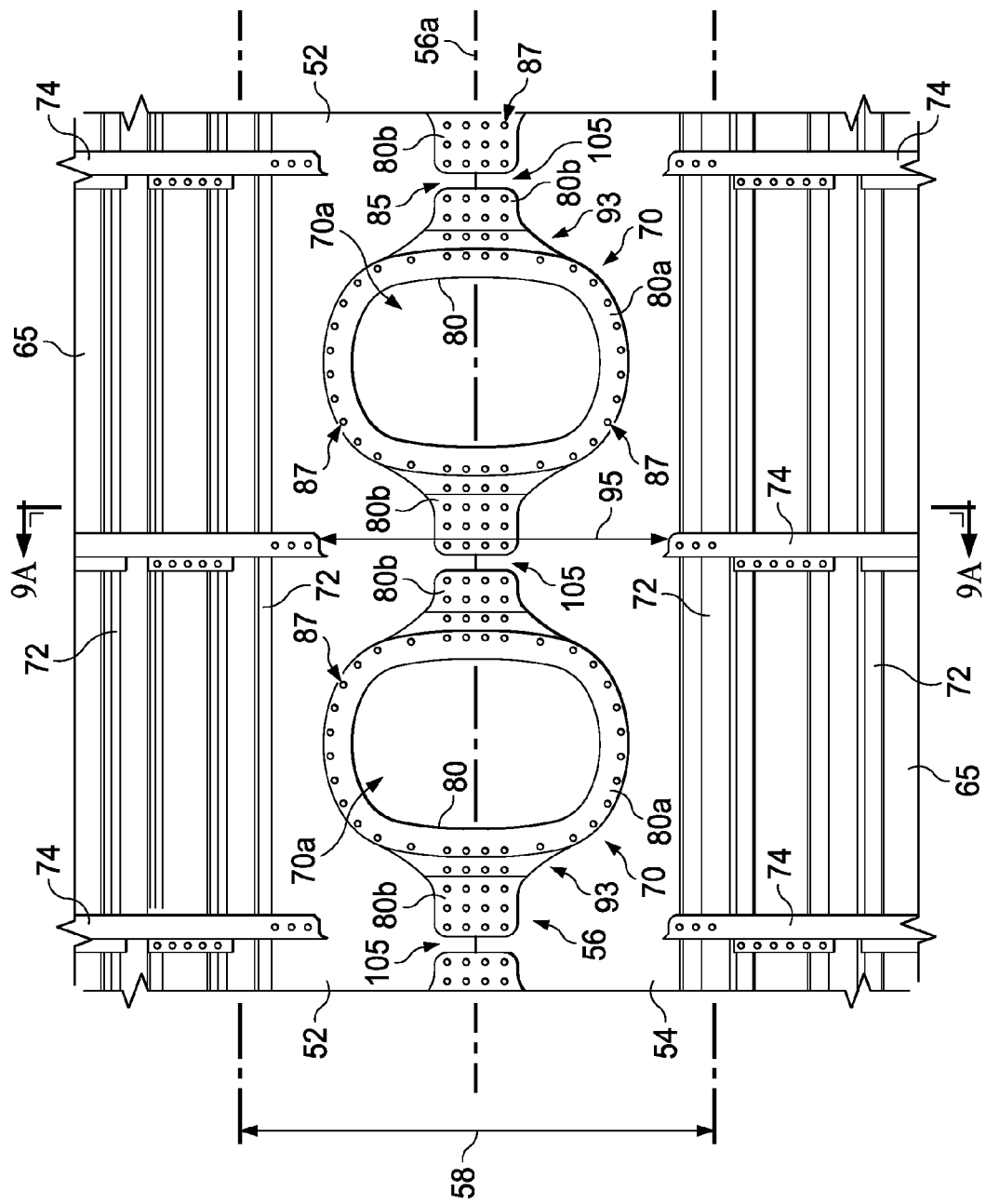

JOINING COMPOSITE FUSELAGE SECTIONS ALONG WINDOW BELTS

BACKGROUND INFORMATION

1. Field

The present disclosure generally relates to a barrel-shaped structure such as an aircraft fuselage, and deals more particularly with a splice joint used to join composite fuselage skin sections along a window belt.

2. Background

An aircraft fuselage may comprise one or more barrel assemblies having an outer composite skin attached to internal framework of circumferential, i.e. barrel-shaped, frames and longitudinal stringers. In one design approach, the barrel assembly has a one-piece outer composite skin that avoids the need for splices in the skin which could add weight to the aircraft. One-piece barrel assemblies require that numerous manufacturing build and assembly tasks be performed either serially or in a sequenced manner which may add to production flow time. Production flow times may be reduced by building multiple panel sections of the barrel assembly concurrently and then splicing them together to form a panelized fuselage. However, the use of a relatively large number of panel sections may increase assembly labor and/or material costs. Additionally, the splices required to join a large number of panel sections may substantially increase the weight of the aircraft.

Composite fuselage skins have ply pad-ups in window belts on the sides of the fuselage where windows are located. These skin pads-ups increase the gauge of the skin to reinforce the windows and/or provide a base for mounting window frames. The panel longitudinal splices are traditionally located in thinner areas of the skin, outside of the window belts.

Accordingly, there is a need for a method of fabricating a composite fuselage that improves production flow by allowing sections of the fuselage to be concurrently fabricated. There is also a need for a method of fabricating a composite fuselage that reduces the number of fuselage panels that are required to be spliced together by building a full barrel section using two half barrels. Further, there is a need for a composite fuselage and related fabrication method that reduce the number of splices, and associated weight of the skin.

SUMMARY

The disclosed embodiments provide a method of manufacturing a fuselage having a composite skin that improves production flow time by enabling concurrent manufacturing of two half barrel sections and joining them together with two longitudinal splice joints located within the window belts of the fuselage. The need for only two splice joints may reduce assembly time and labor, while avoiding or at least minimizing any increase in aircraft weight due to the splice. Skin pad-ups in the window belts provide the dual function of reinforcing the windows and providing the longitudinal splice joints with sufficient strength and stiffness to carry the required skin loads. In one embodiment, the longitudinal splice joints are formed by bonding edges of adjoining skins together, while in other embodiments, the splice joint is implemented using mechanical fastening techniques.

According to one disclosed embodiment, a fuselage comprises a composite skin including upper and lower composite skin sections, a window belt in the composite skin, the window belt including at least one window opening in the composite skin, and a longitudinal splice joint along the window belt joining the upper and lower skins sections together. The upper and lower skin sections may be bonded together at the splice joint. The upper and lower skin sections may have overlapping tapered edges joined together along the splice joint. Each of the upper and lower skin sections include laminated fiber reinforced resin plies with ply drop-offs each forming bonding surfaces along the splice joint. The splice joint may include a composite splice strap bonded to each of the upper and lower skin sections. The composite skin has an increased thickness within the window belt, and the splice joint is located within the increased thickness of the skin. The splice joint may include at least a first splice plate fastened to the upper and lower skin sections. The upper and lower skin sections include inside surfaces and outside surfaces, and the first splice plate is fastened to the upper and lower skin sections by mechanical fasteners, the first splice plate being located inside the fuselage and engaging the inside surfaces of the upper and lower skin sections. The splice joint may include a second splice plate attached to the upper and lower skins sections. The first splice plate is an internal splice plate and the second splice plate is an external splice plate. The upper and lower skin sections each include stepped edges forming a longitudinally extending recess in the upper and lower skins, and the second splice plate is located within the recess. The splice joint may also include a window frame substantially surrounding the window opening and attached to the upper and lower skin sections. The window frame may include splice plate portions extending longitudinally along the window belt and mechanically fastened to the upper and lower skin sections.

According to another disclosed embodiment, a fuselage barrel assembly comprises upper and lower fuselage barrel halves respectively including upper and lower composite skin sections, and window belts in the composite skin respectively on opposite sides of the upper and lower fuselage barrel halves. The composite skin has an increased thickness within the window belts. The fuselage barrel assembly further comprises window openings in the fuselage skin along the window belts, and splice joints between the upper and lower skin sections extending longitudinally along the window belts. The upper and lower skin sections may include tapered overlapping edges, and each of the splice joints includes an adhesive bond between the overlapping tapered edges. In other implementations, the overlapping edges are co-cured. The upper and lower skin sections include tapered edges along the splice joints, and the splice joints each may include a tapered splice strap bonded to the tapered edges of the upper and lower skin sections. The splice joints each may include first and second splice plates respectively fastened to opposite sides of the upper and lower skin sections. Each of the splice joints may include a window frame extending around the window opening and attached to each of the upper and lower skin sections, wherein the window frame includes splice plate portions overlapping and attached to each of the upper and lower skin sections.

According to still another embodiment, a method is provided of making a fuselage barrel assembly having windows located along longitudinal window belts. The method comprises fabricating an upper barrel half having an upper composite skin, fabricating a lower barrel half having a lower composite skin, and joining the upper and lower barrel halves, including splicing the upper and lower skins together along the window belts. The method may further comprise forming ply pad-ups in the upper and lower skins along the window belt, and forming window openings in the upper and lower skins within the pad-ups. Fabricating the upper and lower barrel halves includes fabricating each of the upper and lower skins by laminating plies of fiber reinforced resin, and increasing the thickness of the laminated plies in the area of the window belts. Splicing the upper and lower skins together may include overlapping edges of the upper and lower skins, and adhesively co-curing or bonding the overlapping edges together. Splicing the upper and lower skins together may include joining a splice strap to the overlapping edges. Splicing the upper and lower skins may include fastening the upper and lower skins between external and internal splice plates. Splicing the upper and lower skins includes fastening a window frame to the upper and lower skins.

According to a further embodiment, a method is provided of making a fuselage barrel having windows located along longitudinal window belts. The method comprises fabricating a laminated composite fuselage skin, including fabricating upper and lower composite skin sections and forming pad-ups along edges of the upper and lower skin sections to increase the thickness of the fuselage skin along the window belts. The method further comprises assembling the upper and lower composite skin sections together, including forming longitudinal splice joints between the upper and lower skin sections within the pad-ups, and forming window cutouts in the fuselage skin within the pad-ups.

According to another embodiment, a method is provided of making a fuselage barrel assembly. The method comprises fabricating an upper barrel half having an upper composite skin, fabricating a lower barrel half having a lower composite skin, placing each of the upper and lower barrel halves in a splice assembly feature, including co-locating edges of the upper and lower skins, and splicing together the edges of the upper and lower skins. Splicing the edges of the upper and lower skins may be performed by adhesively bonding the edges together, alternatively, splicing the edges of the upper and lower skins may be performed by co-curing the upper and lower skins. Splicing the edges of the upper and lower skins may be performed by fastening splice plates between the upper and lower skins. Splicing the edges includes overlapping and joining the edges of the upper and lower skins. The method may further comprise forming window cutouts in each of the upper and lower skins, wherein splicing the upper and lower skins together includes placing window frames in the window cutouts and fastening each of the window frames to each of the upper and lower skins. Fabricating the upper and lower barrel halves includes forming a longitudinal recess in the edges of the upper and lower skins, and splicing the edges together includes placing a splice plate in the recess and fastening the splice plate to each of the upper and lower skins.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is an illustration of a sectional view taken along the line 6-6 in FIG. 5, the window frames and frame sections not shown for clarity for one form of the bonded splice joint.

FIG. 6A is an illustration of the area designated as FIG. 6A in FIG. 6.

FIG. 9 is an illustration of the interior side of the fuselage shown in FIG. 8, with sections joined together by one form of a mechanical splice, prior to installation of frame splices.

DETAILED DESCRIPTION

Figure 2:
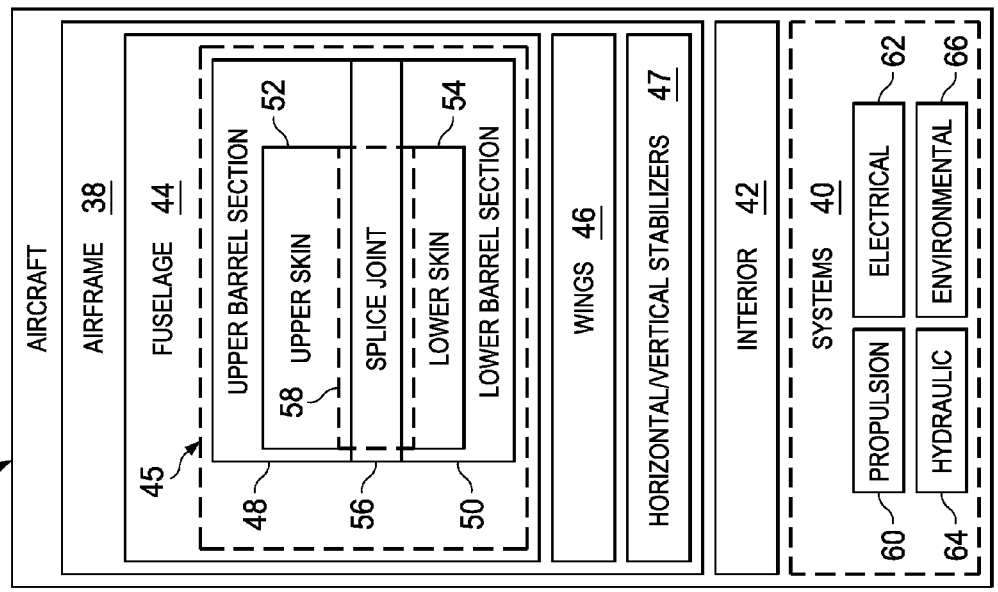
FIG. 2 is illustration of a block diagram of an aircraft.
Figure 1:
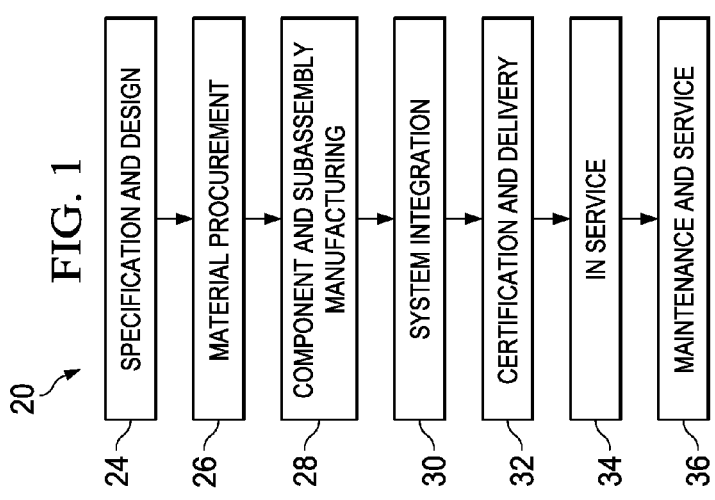
FIG. 1 is an illustration of a flow diagram of aircraft production and service methodology.

The disclosed embodiments involve the fabrication of a barrel-type structure, such as an aircraft fuselage having a composite outer skin, in which panelized fuselage sections are joined together by longitudinal splice joints. The embodiments, may however, have application in fields other than the aerospace industry. Referring now to FIGS. 1 and 2, embodiments of the disclosure may be used in the context of an aircraft manufacturing and service method 20 as shown in FIG. 1 and an aircraft 22 as shown in FIG. 2. During preproduction, exemplary method 20 may include specification and design 24 of the aircraft 22 and material procurement 26. During production, component and subassembly manufacturing 28 and system integration of the aircraft 22 takes place. Thereafter, the aircraft 22 may go through certification and delivery 32 in order to be placed in service 34. While in service by a customer, the aircraft 22 is scheduled for routine maintenance and service 36, which may also include modification, reconfiguration, refurbishment, and so on.

Each of the processes of method 20 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 22 produced by exemplary method 20 may include an airframe 38 with a plurality of systems 40 and an interior 42. Examples of high-level systems 40 include one or more of a propulsion system 60, an electrical system 62, a hydraulic system 64, and an environmental system 66. Any number of other systems may be included. The airframe 38 includes a fuselage 44, wings 46 and horizontal and vertical stabilizers 47. The fuselage 44 may comprise one or more barrel assemblies 45 each of which includes an upper barrel section 48 and a lower barrel section 50. Each of the barrel sections 48, 50 may form a half, or form split upper and lower sections of the barrel assembly 45. Barrel sections 48, 50 respectively include an upper skin section 52 and a lower skin section 54 that are joined together by two longitudinal splice joints 56 to form a composite outer skin 73 of the barrel assembly 45. The splice joints 56 are located within window belts 58 of the fuselage 44 where one or more windows (not shown) may be located. As will be discussed in more detail below, the disclosed splice joints 56 are located within the skin ply pads-ups used to reinforce the windows in the window belts 58, thereby reducing the weight of the aircraft 22 and improving manufacturing efficiency.

Systems and methods embodied herein may be employed during any one or more of the stages of the production and service method 20. For example, components or subassemblies corresponding to production process 28 may be fabricated or manufactured in a manner similar to components or subassemblies produced while the aircraft 22 is in service. Also, one or more apparatus embodiments, method embodiments, or a combination thereof may be utilized during the production stages 28 and 30, for example, by substantially expediting assembly of or reducing the cost of an aircraft 22. Similarly, one or more of apparatus embodiments, method embodiments, or a combination thereof may be utilized while the aircraft 22 is in service, for example and without limitation, to maintenance and service 36.

Figure 3:
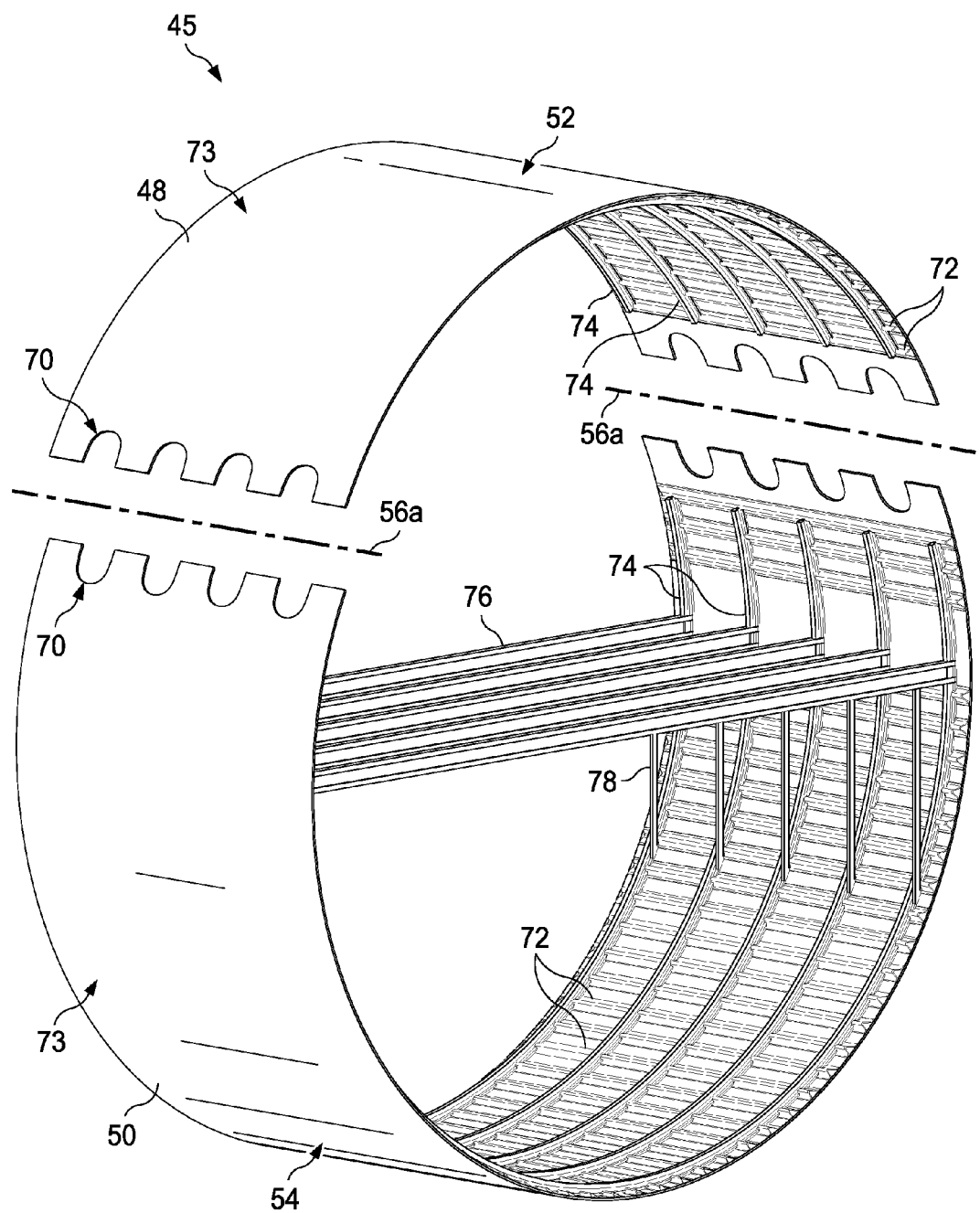
FIG. 3 is an illustration of two half fuselage barrel sections about to be joined together.
Figure 4:
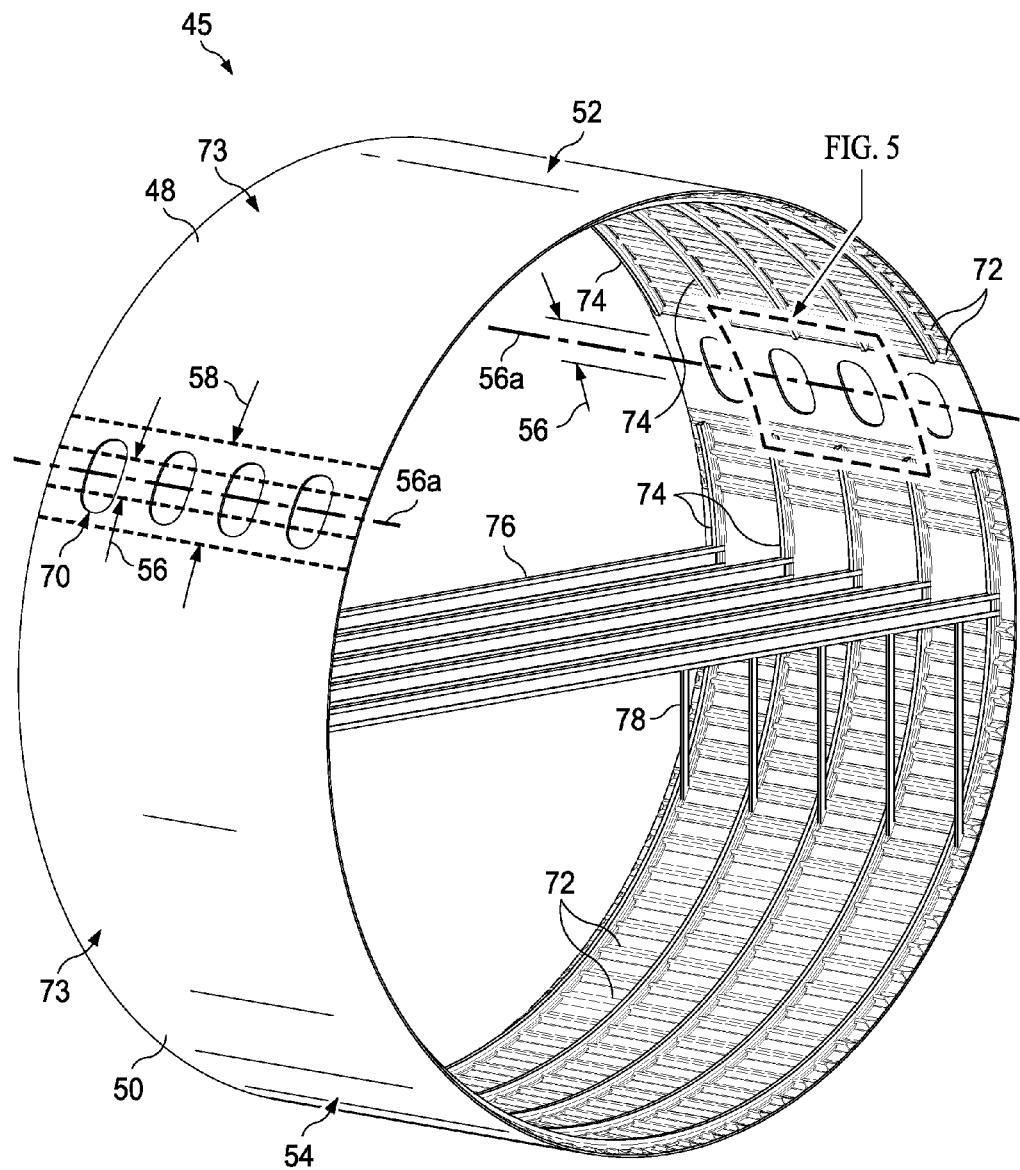
FIG. 4 is an illustration similar to FIG. 3 but showing the two half barrel sections having been joined together by longitudinal splice joints.

Referring now to FIGS. 3 and 4, the fuselage barrel assembly 45 broadly comprises upper and lower barrel sections 48, 50, respectively, which may also sometimes also be referred herein as upper and lower barrel halves or barrel half sections 48, 50. The upper and lower barrel half sections 48, 50 are joined together by a pair of longitudinally extending splice joints 56 respectively on opposite left and right sides of the barrel assembly 45. Each of the splice joints 56 is located within an area of a window belt 58 where one or more windows 70 may be located, and the outer skin 73 of the fuselage barrel assembly 45 is padded up to an increased thickness.

In the illustrated example, the center line 56a of the splice joint 56 passes through approximately the middle of a row of the windows 70. While the fuselage barrel assembly 45 is shown as having a generally circular cross sectional shape, other cross sectional shapes are possible. Also, while the barrel sections 48, are approximately half sections forming a two-piece barrel assembly 45, it should be noted here that the upper and lower barrel halves 48, 50 may each themselves be formed of two or more sections. However, the illustrated barrel assembly 45 employing only two sections or halves 48, 50 may represent an optimum arrangement for applications wherein it is desired to minimize the number of joints between the sections, and/or improve production flow by allowing the barrel sections 48, 50 to be fabricated concurrently. As will be discussed below, each of the splice joints 56 may be any suitable form of joint between the upper and lower barrel half sections 48, 50 along the window belt 58. Thus, as used herein, "splice joint" is intended to include a wide range of joint configurations, including but not limited to tapered lap joints, step lap joints, finger joints and joints employing individual splice elements to join the upper and lower barrel half sections 48, 50 together.

The barrel half sections 48, 50 respectively include upper and lower outer composite skin sections 52, 54 each comprising laminated plies of a fiber reinforced resin, and collectively forming the outer skin 73 of the barrel assembly 45. The thickness or gauge (not shown) of the skin sections 52 is greater in the area of the window belt 58 in order to reinforce the window cutouts 70a. This increased skin thickness in the area of the window belts 58, achieved by ply pad-ups in the upper and lower skin sections 52, 54, also allows the splice joints to carry the required loads, thereby obviating the need for additional pad-ups for the splice joint 56. The skin sections 52, 54, are attached to interior framework comprising longitudinally spaced, circumferential or barrel-shaped frames 74 and longitudinally extending, circumferentially spaced stringers 72 which are attached to the skin sections 52, 54 using fastening, bonding or other techniques. A plurality of transversely extending floor beams 76 are secured to the frames 74 and are partially supported by stanchions 78 connected to the frames 74. Other interior framework configurations are possible.

Figure 5:
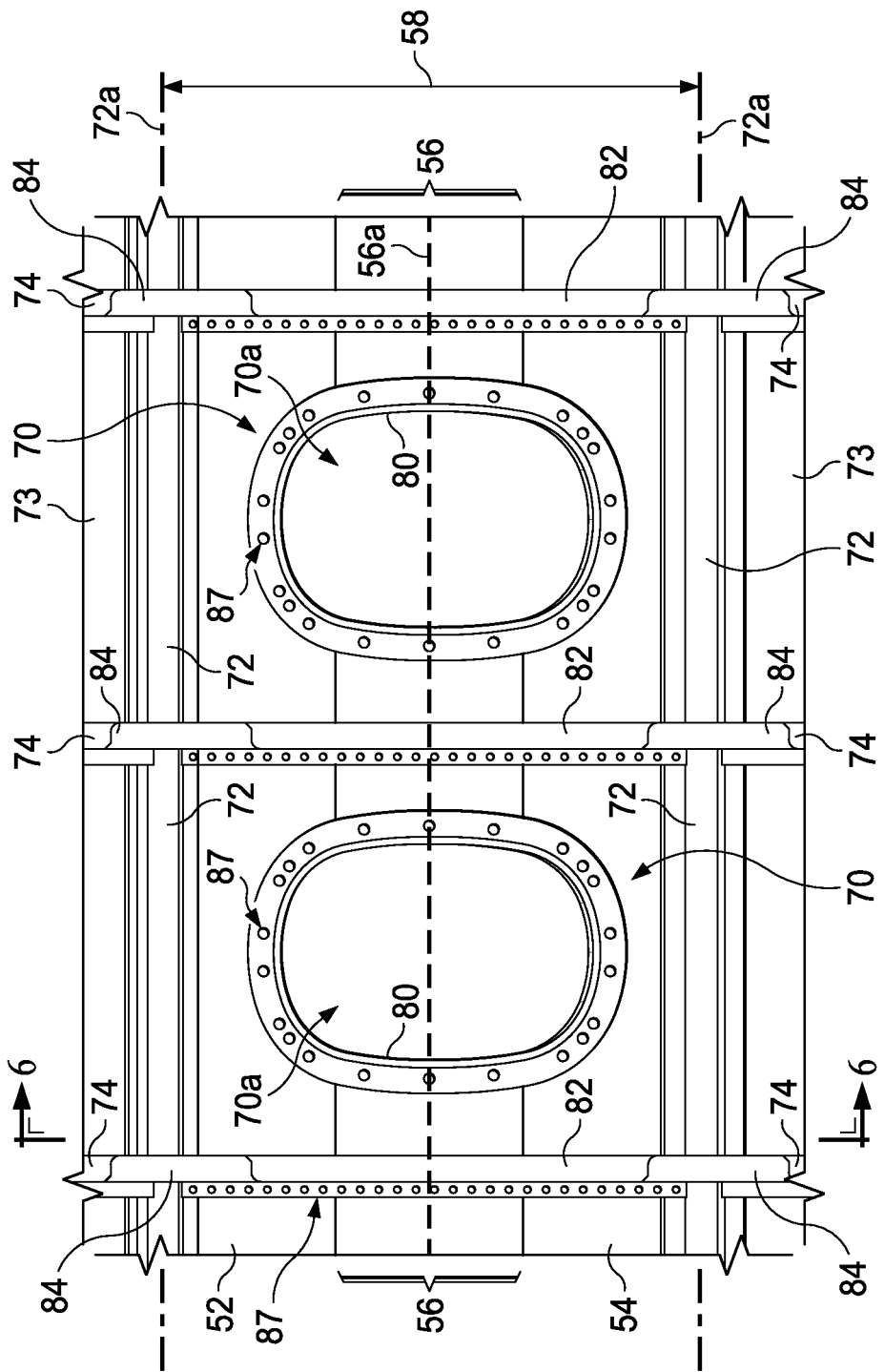
FIG. 5 is an illustration of an interior view in the direction designated as FIG. 5 in FIG. 4 for a bonded joint.

Referring now to FIG. 5, each of the windows 70 includes a window cutout 70a surrounded by a reinforcing window frame 80 attached to the upper and lower skin sections 52, 54 by any suitable means, such as by fasteners. Each of the windows 70 is located between two adjacent stringers 72 and two adjacent frame splice segments 82 that are attached to the frames 74 by frame splices 84. The splice joint 56 between the upper and lower skin sections 52, 54 can be seen to be located within the window belt 58 which extends between the stringers 72. The centerlines of the stringers 72 are indicated at 72a. The splice joint 56 may or may not extend the full height of the window belt 58. In the illustrated example, the centerline 56a of the splice joint 56 substantially coincides with the centerline of the window belt 58, however in other embodiments, these two centerlines may be somewhat offset from each other.

Referring to FIGS. 6 and 6A, the upper and lower skin sections 52, 54 are each tailored to include ply pad-ups 75 within the window belt 58 extending between adjacent stringers 72, resulting in a skin thickness or gauge "t" that is greater within the window belt 58 than the skin thickness "$t_1$" above and below the window belt 58. The pad-ups 75 extend essentially the full height of the window belt 58, between the stringers 72. The splice joint 56 lies within the pad-ups 75 used to reinforce the window cutouts 70a, thus taking advantage of the increased skin thickness "t" needed to reinforce the window cutouts 70a, to carry loads between the upper and lower skin sections 52, 54. In other words, the disclosed embodiments take advantage of the presence and location of the pad-ups needed to reinforce the window cutouts 70a within the window belt 58, by locating the splice joint 56 within the window belt 58, thereby obviating the need for a separate pad-up for the splice joint 56. In this example, the splice joint 56 is a bonded tapered lap joint, however, as previously mentioned, other joint configurations are possible.

Figure 6B:
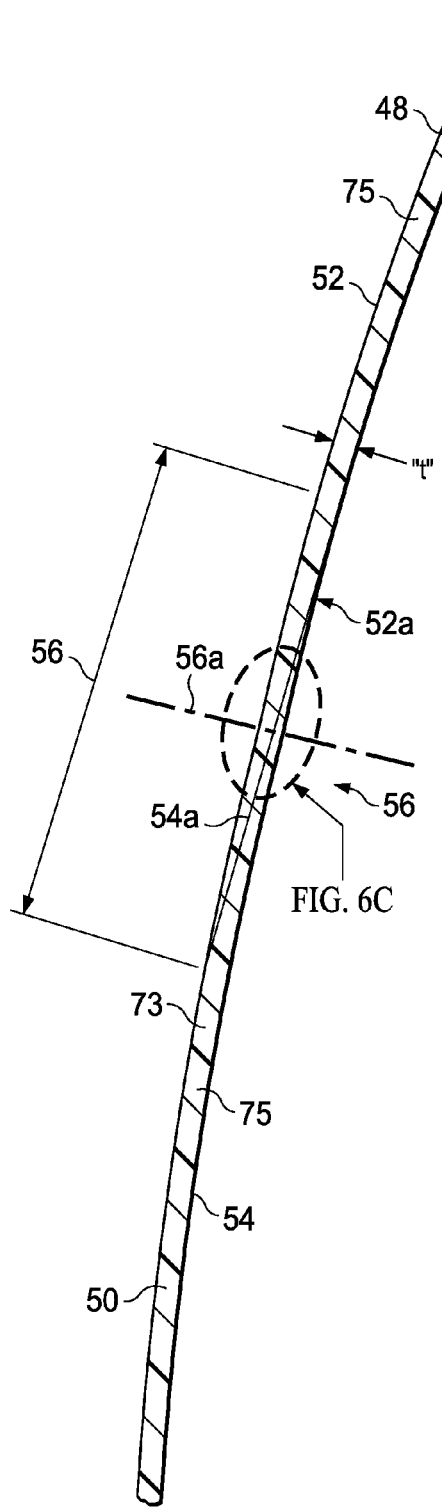
FIG. 6B is an illustration of the area designated as FIG. 6B in FIG. 6.
Figure 6C:
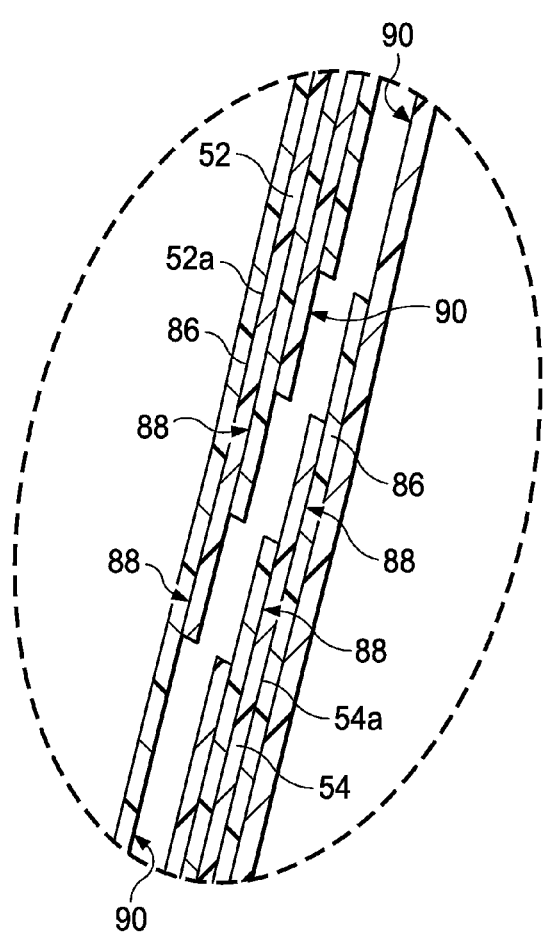
FIG. 6C is an illustration of the area designated as FIG. 6C in FIG. 6B.

FIGS. 6B and 6C illustrate additional details of the bonded splice joint 56 shown in FIG. 6. The bonded splice joint 56 is formed by overlapping edges 52a, 54a of the skin sections 52, 54 respectively. As best seen in FIG. 6C, each of the skin sections 52, 54 comprises a plurality of fiber reinforced resin plies 86, and the tapered edges 52a, 54a comprise a plurality of matching ply steps 88 forming a step lap joint configuration. Each of the ply steps 88 may comprise one or more plies 86 formed by ply drop-offs. The thickness "t" of the skin sections 52, 54 within the area of the splice joint 56 is determined by the thickness and number of skin plies 86 (FIG. 6C), and is selected such that the skin 73 and the splice joint 56 can carry all necessary loads in the area of the window belt 58. Each of the ply steps 88 forms a bonding surface 90. The ply drop-off or taper ratio of the edges 52a, 52b may be selected to suit the particular application, and may determine, at least in part, the total amount of bond surface 90 that is available to create a load-carrying bonded joint between the upper and lower skin sections 52, 54 respectively. Generally, a taper ratio may be selected that will result in bond surfaces 90 that are sufficient in area to give the splice joint 56 enough strength within the window belt 58 to both adequately reinforce the window cutouts 70a, and to transfer loads between the skin sections 52, 54.

Figures 7, 7A:
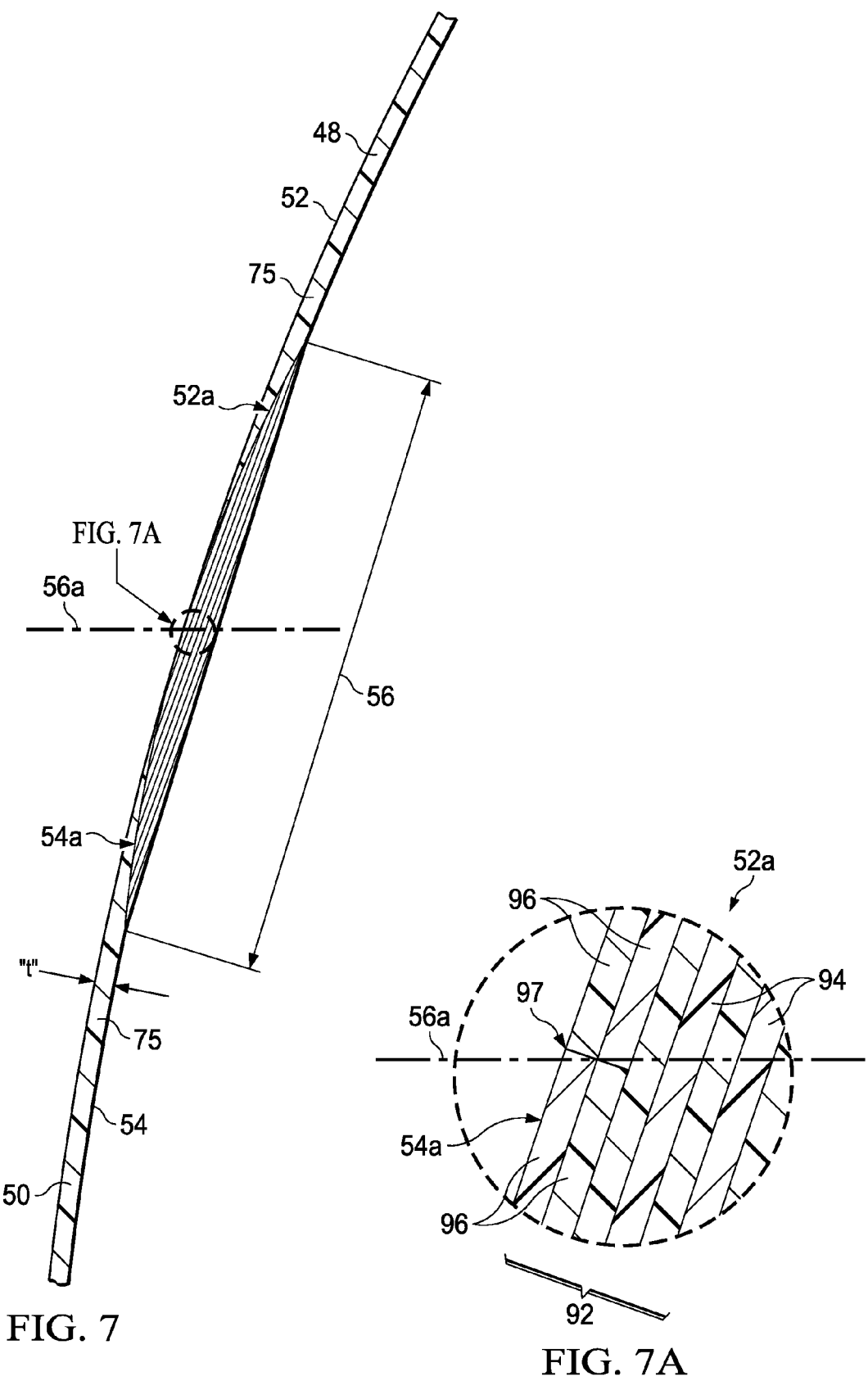
FIG. 7 is an illustration of a sectional view similar to FIG. 6 but showing an alternate form of the bonded splice joint.
FIG. 7A is an illustration of the area designated as FIG. 7A in FIG. 7.

Attention is now directed to FIGS. 7 and 7A which illustrate an alternate embodiment of the bonded splice joint 56. In this example, the edges 52a, 54a of the skin sections 52, 54 are oppositely tapered and are bonded to a double tapered splice strap 92 which may comprise multiple plies 94 (FIG. 7A) of a suitable fiber reinforced resin, similar to the plies of the skin sections 52, 54. As best seen in FIG. 7A, one or more plies 96 of the outer edges 52a, 54a of skin sections 52, 54 may face and abut each other generally in the area of the centerline 56a of the joint 56, forming a butt joint 97 overlying the splice strap 92. In other embodiments however, the plies 96 may not abut each other, rather there may be a slight gap (not shown) between the plies at the outer edges 52a, 52b. In the case of the embodiments shown in FIG. 5-7A, mechanical fasteners 87 (FIG. 5) used to attach the window frames 80 and the frame splices 82 to the upper and lower skins 52, 54 may function to slow or arrest the propagation of any splice separation occurring in the laminate skin sections 52, 54, while also providing a redundant load paths. Other bonded joint configurations employing a bonded splice strap are possible, including but not limited to those in which the splice strap 92 forms step lap joints or finger joints with the upper and lower skin sections 52, 54.

Figure 8:
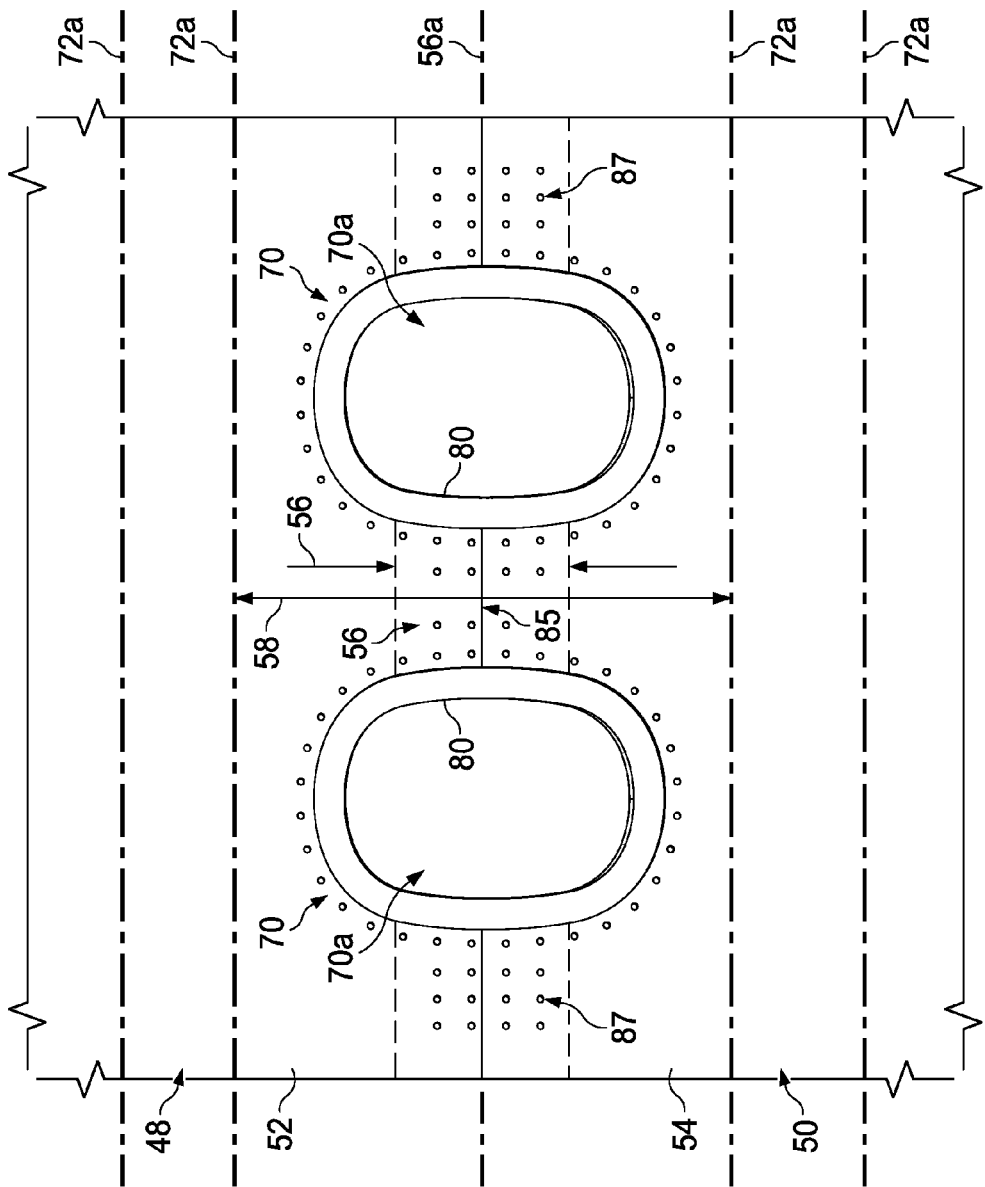
FIG. 8 is an illustration of an exterior side view of a fuselage showing barrel sections joined together by one form of a mechanical splice joint.
Figure 9A:
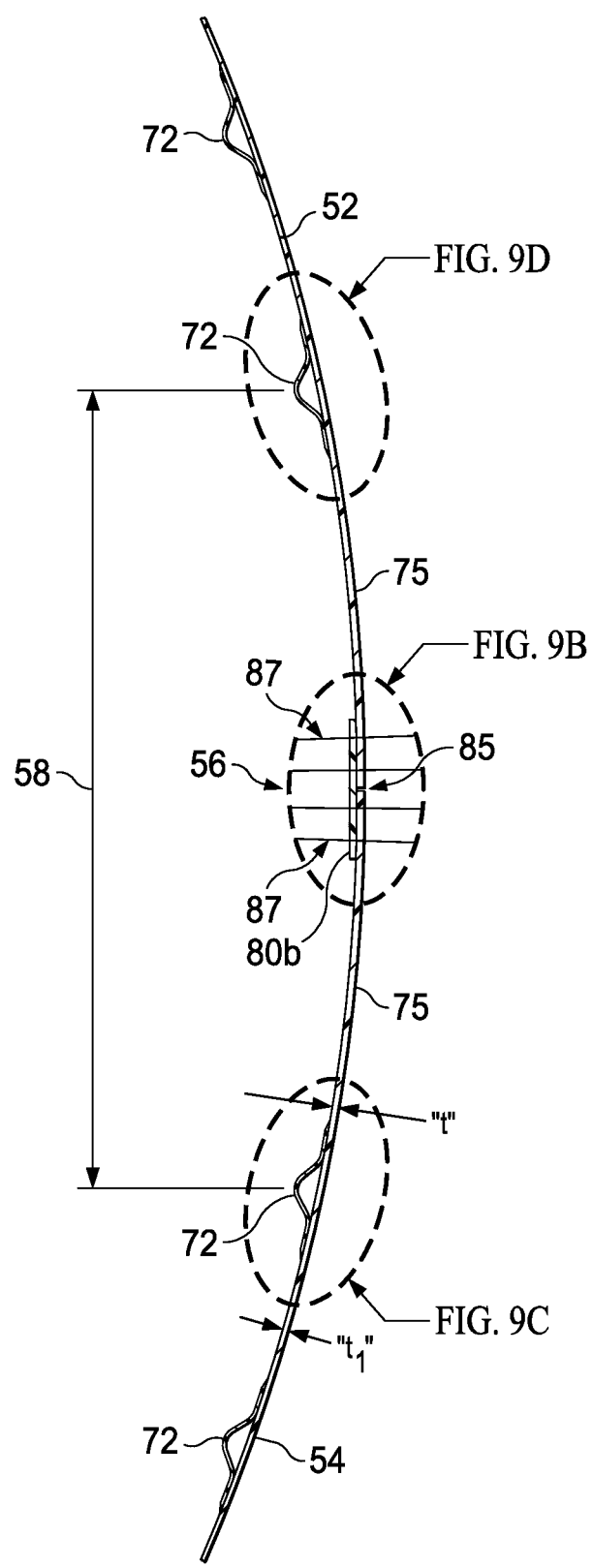
FIG. 9A is an illustration of a sectional view taken along the line 9A-9A in FIG. 9.
Figure 9B:
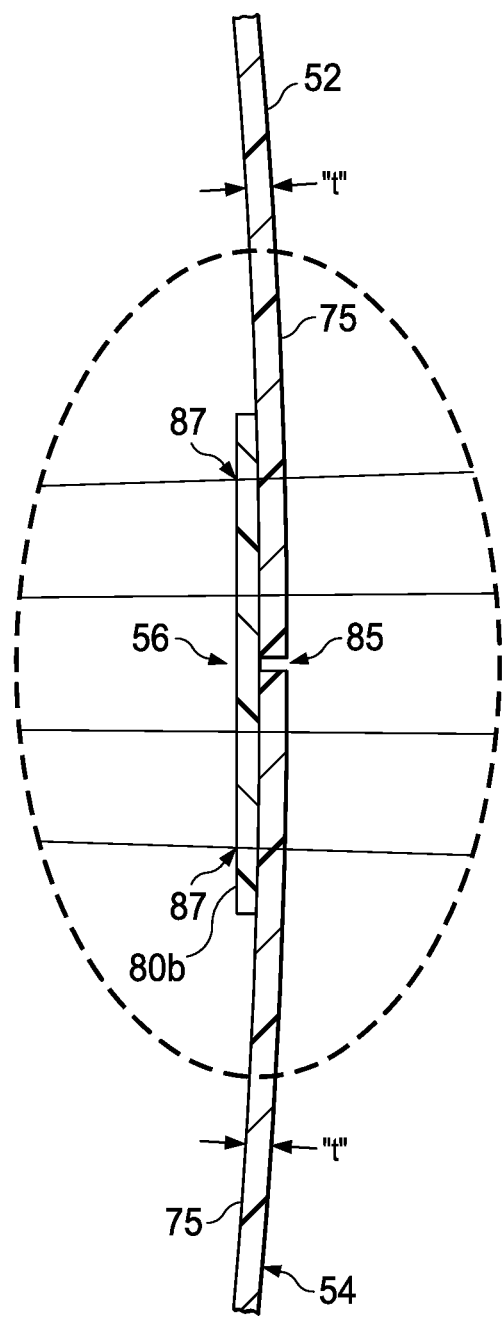
FIG. 9B is an illustration of the area designated as FIG. 9B in FIG. 9A
Figure 9C:
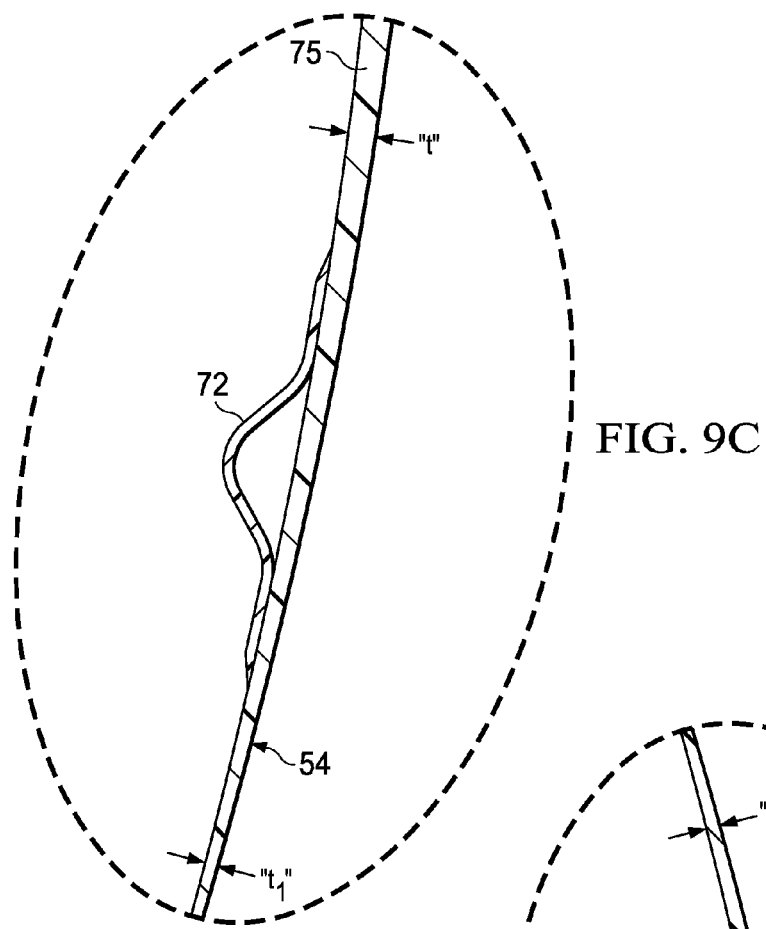
FIG. 9C is an illustration of the area designated as FIG. 9C in FIG. 9A.
Figure 9D:
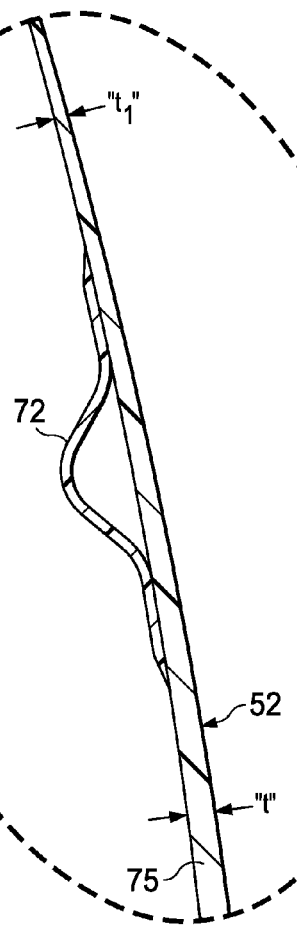
FIG. 9D is an illustration of the area designated as FIG. 9D in FIG. 9A.

As an alternative to the method described above in which the splice joint 56 between the upper and lower skin sections 52, 54 is formed by bonding, a mechanical fastening method may instead be employed to form the splice joint 56. For example, referring to FIGS. 8-10, longitudinal splice joint 56 located within the window belt 58 uses suitable mechanical fasteners 87 to join the upper and lower skin section 52, 54. As best seen in FIG. 8, the centerline 56a of the splice joint 56 passes substantially through the center of the window cutouts 70a, within the window belt 58. The upper and lower skin sections 52, 54 form a joint line 85. A slight gap (not shown) may be present between the skin sections 52, 54 at the joint line 85. As will become apparent below, the laminated skin sections 52, 54 are padded up with additional plies within the window belt 58 in order to reinforce the window cutouts 70a, similar to the embodiments previously described in connection with FIGS. 5-7.

Referring particularly to FIGS. 9, 9A, 9B, 9C and 9D, window frames 80 are formed of a suitable rigid material such as a metal or a composite. Each of the window frames 80 includes a frame portion 80a surrounding and reinforcing the window cut-outs 70a, and longitudinal splice plate portions 80b formed integral with the frame portions 80a. The splice plate portions 80b are substantially aligned with the centerline 56a and cover the joint line 85 between the upper and lower skins 52, respectively. In effect, window frames 80 form a series of internal splice plates 93 respectively within the frame bays 65 that form a single shear joint between the upper and lower skin sections 52, 54 along the joint line 85. As best seen in FIGS. 9A, 9B, 9C and 9D, the upper and lower skin sections 52, 54 are each tailored to include ply pad-ups 75 within the window belt 58 extending between adjacent stringers 72, resulting in a skin thickness or gauge "t" that is greater within the window belt 58 than the skin thickness "$t_1$" above and below the window belt 58. The pad-ups 75 extend essentially the full height of the window belt 58, between the stringers 72. The splice joint 56 formed by the window frames 80, including the splice plate portions 80b, lies within the region including with pad-ups 75, thus taking advantage of the increased skin thickness "t" needed to reinforce the windows 70, to carry loads between the upper and lower skin sections 52, 54. As shown in FIG. 9, suitable fasteners 87 attach the window frames 80, including the splice plate portions 80b, to both the upper and lower skin sections 52, 54.

Figure 10:
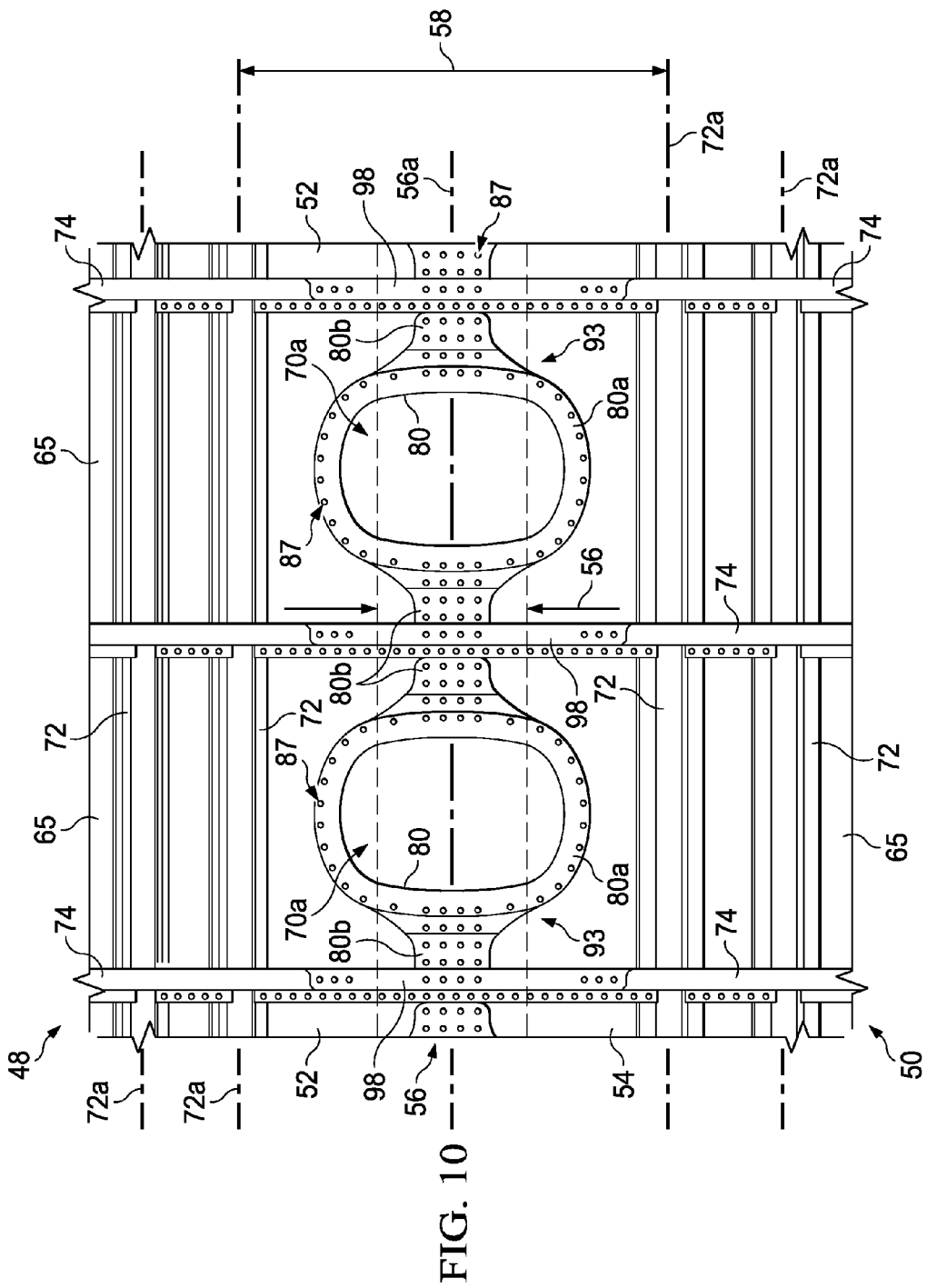
FIG. 10 is an illustration similar to FIG. 9, but with frame splices having been installed.
Figure 11:
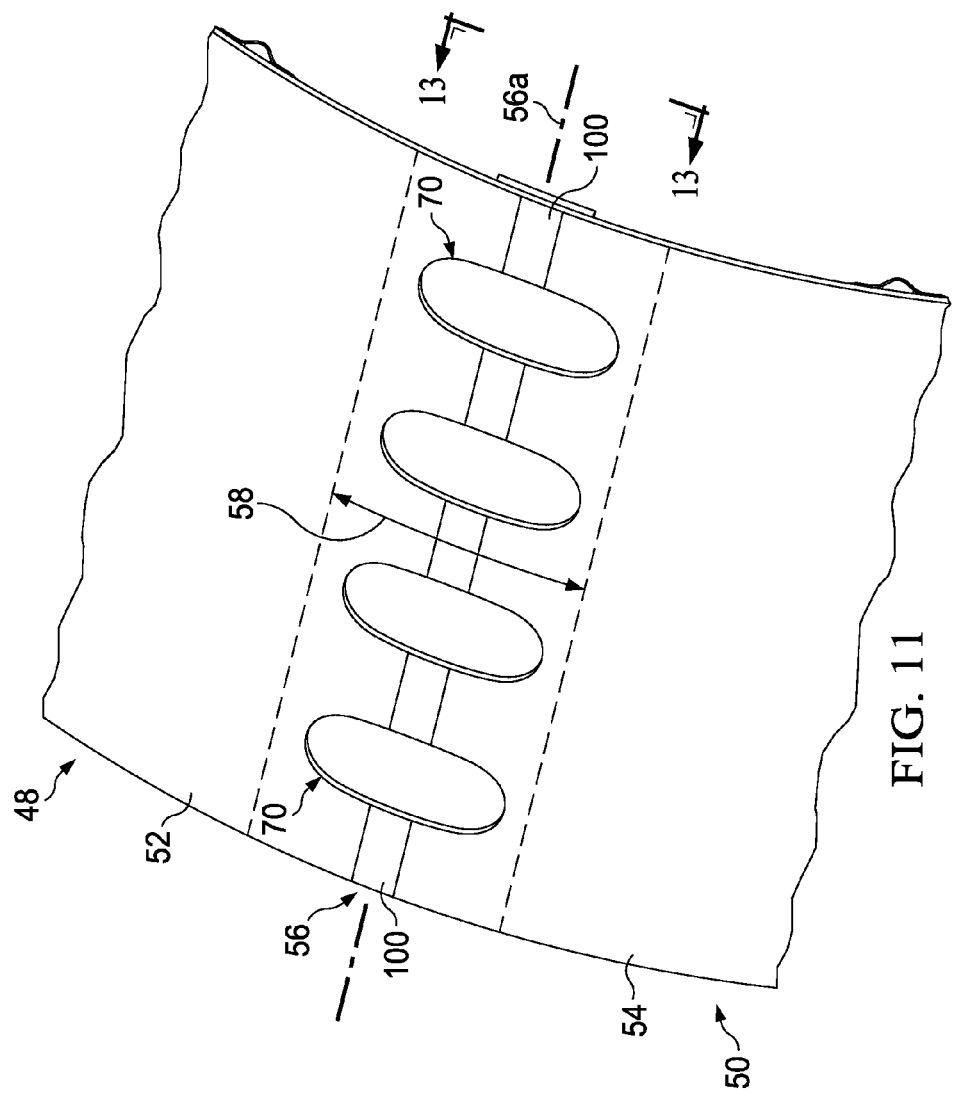
FIG. 11 is an illustration of a perspective view of the exterior side of a fuselage in which the barrel sections are joined together using an alternate form of a mechanical splice joint.
Figure 12:
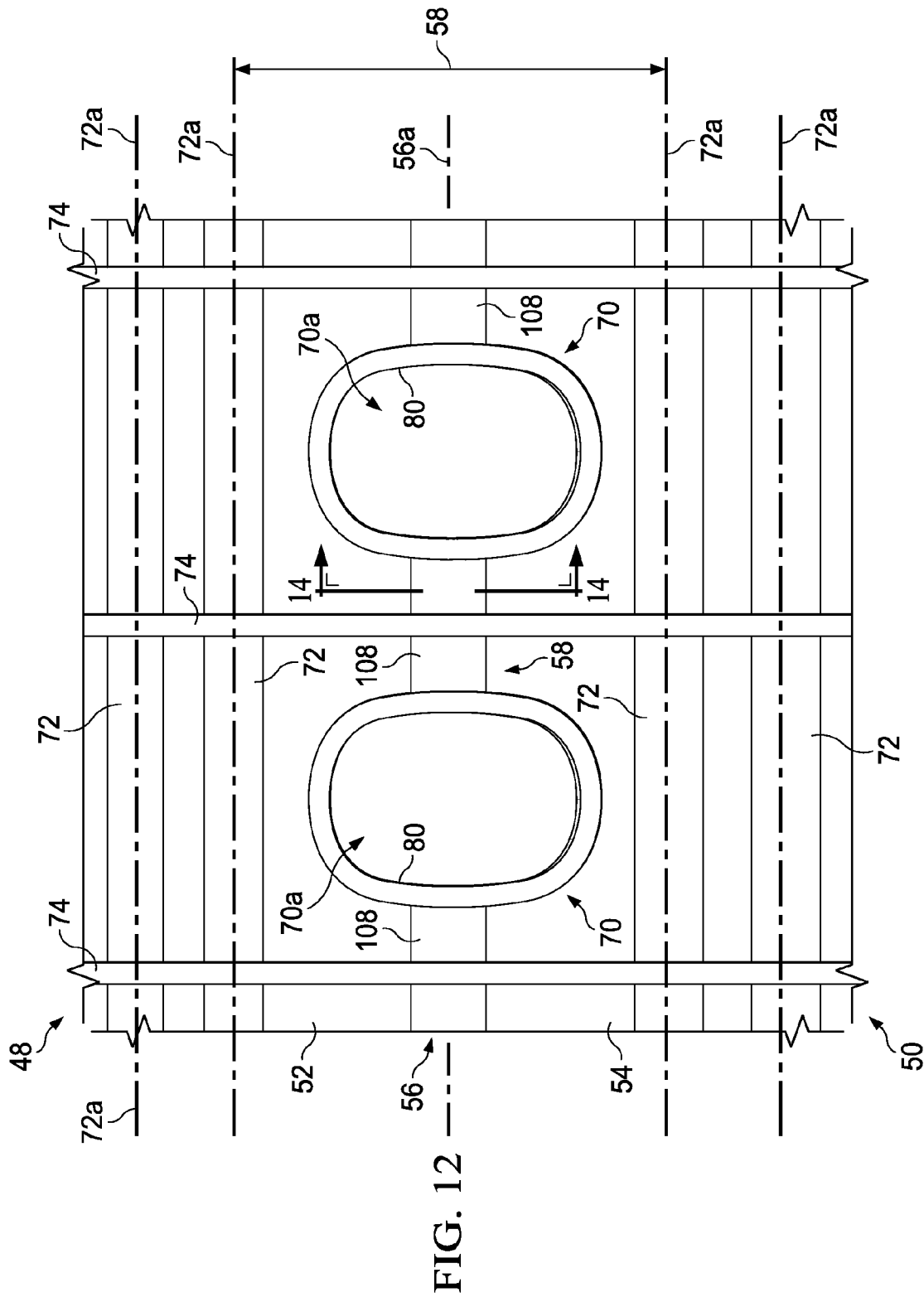
FIG. 12 is an illustration of the interior side of the fuselage shown in FIG. 11.

Referring particularly to FIG. 9, the window frame splice extensions 80b of window frames 80 may be slightly spaced apart to form gaps 105 between adjacent window frames. A gap 95 is also present between the frames 74 of the upper and lower barrel sections 48, 50, respectively. As shown in FIG. 10, in order to connect the frames 74 of the upper and lower barrel sections 48, 50 together, frame splices 98 are installed between and attached to the frames 74, covering gaps 95 and 105 (FIG. 9). The frame splices 98 are also fastened to the upper and lower skin sections 52, 54.

FIGS. 11-14 illustrate another embodiment of the splice joint 56 employing mechanical fastening which may reduce any centroid eccentricities and/or bending moments that may be present in the single shear splice joint shown in FIGS. 8-10. As in the case of the previous examples, the upper and lower skin sections 52, 54 have an increased thickness in the area of the window belt 58 for window cutout and splice joint reinforcement.

Figure 13:
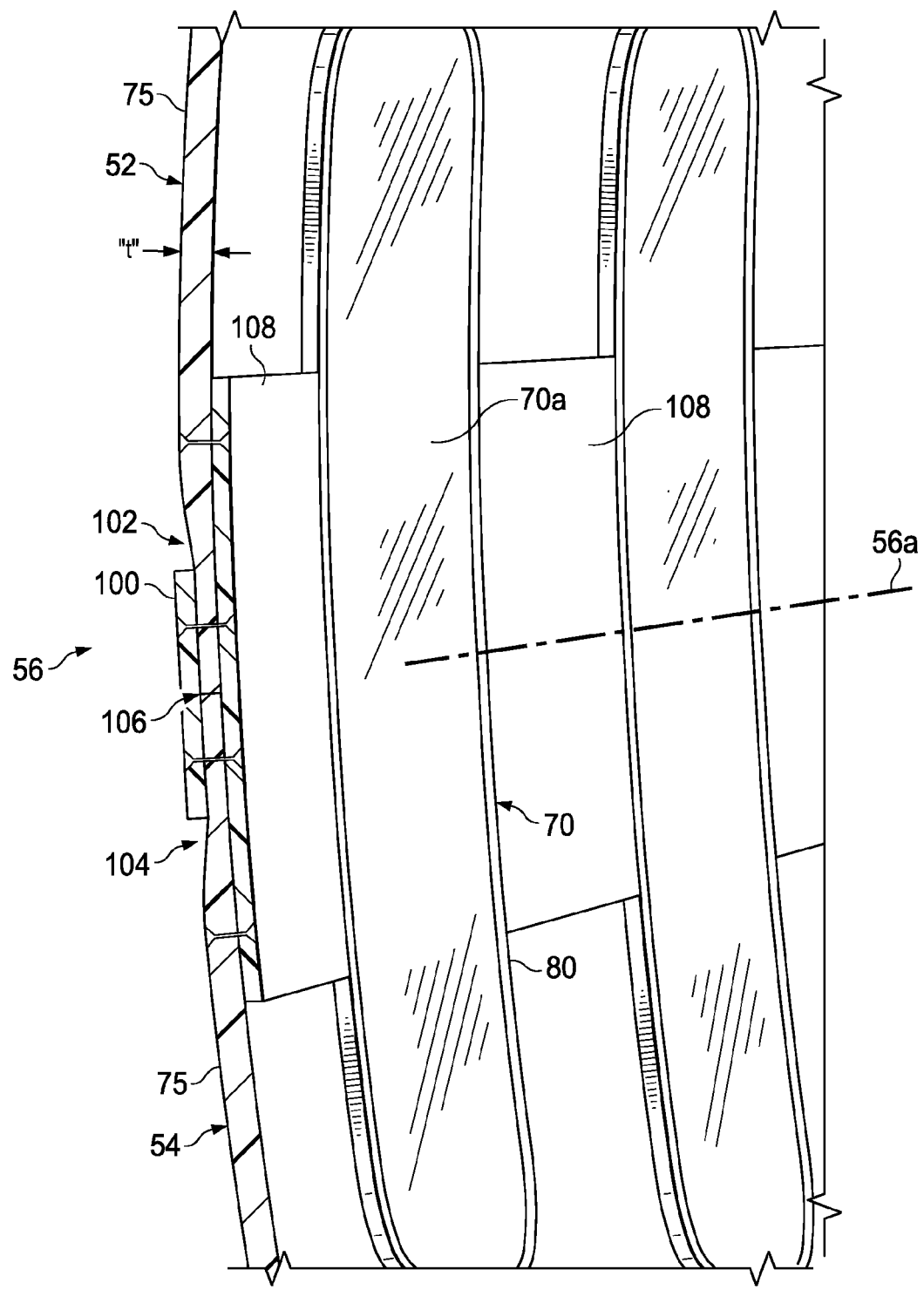
FIG. 13 is an illustration of an isometric view in the direction shown as FIG. 13 in FIG. 11.
Figure 14:
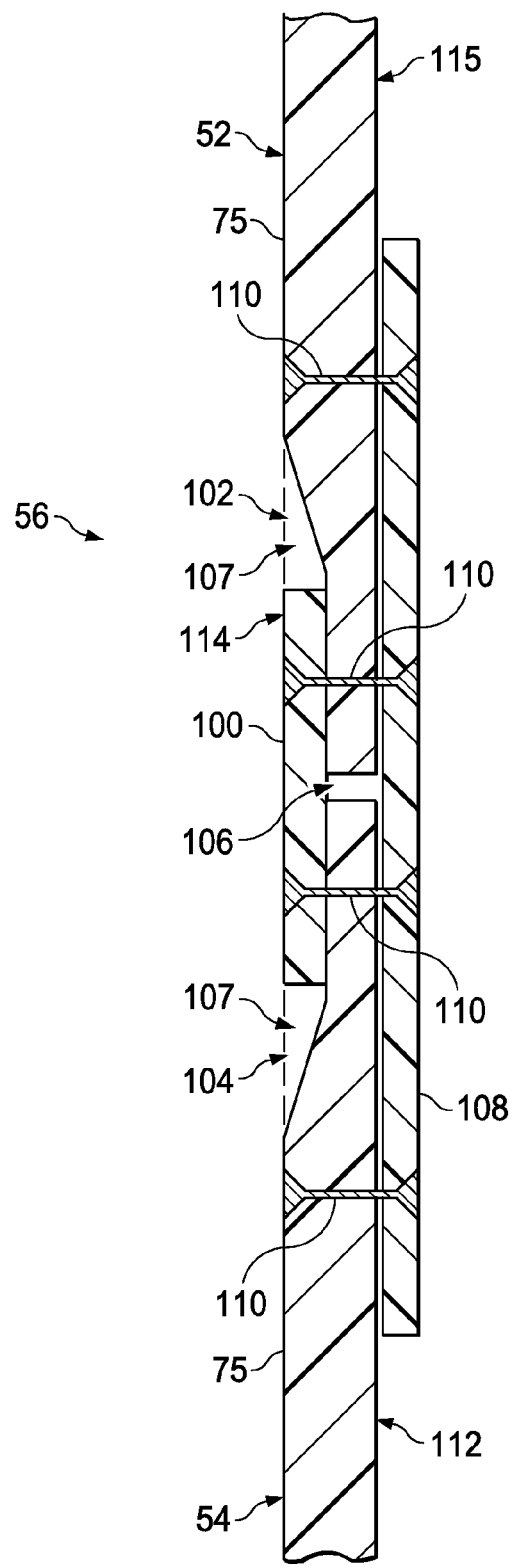
FIG. 14 is an illustration of a sectional view taken along the line 14-14 in FIG. 12.

Referring particularly to FIGS. 13 and 14, the adjacent edges of the upper and lower skin sections 52, are stepped to respectively form external recesses 102, 104 along the window belt 58. The edges of the upper and lower skin sections 52, 54 are aligned in proximity to each other, with a slight gap therebetween, along a joint line 106 between the upper and lower skin sections 52, 54. An external splice plate 100 is located within the tapered recesses 102, 104 of the upper and lower skin sections 52, 54. The external surface 114 (FIG. 14) of the external splice plate 100 may be generally flush with the skin outer mold line (CML) 112. The external splice plate 100 overlies the joint line 106 of the upper and lower skin sections 52, 54. Splice joint 56 further includes multiple internal splice plates 108 which lie flush against the IML (inner mold line) 115 of the skin sections 52, 54, and overlie the joint line 106. Thus, the upper and lower skin sections 52, 54 are in face-to-face contact with, and are captured between the external splice plate 100 and the internal splice plates 108, forming a double shear joint between the upper and lower skin sections 52, 54. Suitable fasteners 110 fasten the external and internal splice plates 100, 108 to each other and to the upper and lower skin sections 52, 54. Any gaps 107 (FIG. 14) that may exist between the external splice plate 108 and the skin sections 52, 54 within the recesses 102, 105 may be filled with an aero filler (not shown) suitable for the application.

Figure 15:
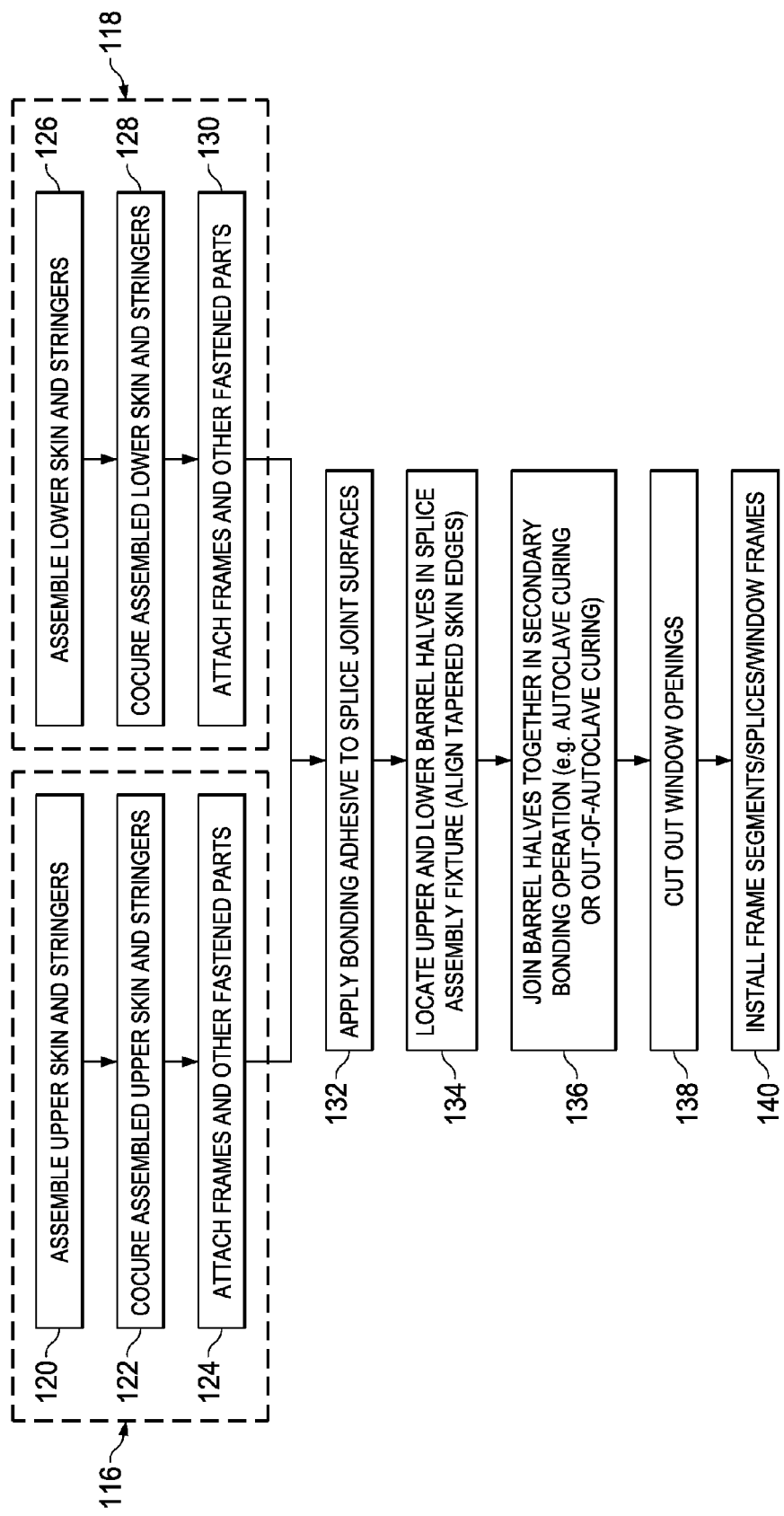
FIG. 15 is an illustration of a flow diagram of a method of fabricating a fuselage barrel assembly using one form of a bonded splice joint.

Attention is now directed to FIG. 15 which broadly illustrates the steps of a method of fabricating a fuselage barrel assembly 45 of the type shown in FIGS. 3 and 4, using the bonding technique previously discussed in connection with FIGS. 5, 6 and 6A. The upper and lower barrel sections 48, 50 respectively are concurrently fabricated at 116, 118, including padding up edges of the skin sections 52, 54 to be joined by the longitudinal splice joints at the window belts. As part of the sequence 116, the upper skin section 52 and stringers 72 are assembled at 120. At 122, the assembled upper skin section 52 and stringers 72 are co-cured using conventional techniques such as autoclave curing although out-of-autoclave curing may be possible. Other techniques for assembling the upper skin section 52 and the stringers 72 are possible, including the use of mechanical fasteners. At 124, the frames 74 and other mechanically fastened components such as cutout reinforcement plates (not shown), are attached using mechanical fasteners or other suitable means, to the assembly of the upper skin section 52 and the stringers 72.

The lower barrel section 50 is assembled in a sequence 118 similar manner to the sequence 116 described above. At 126, the lower skin section 54 and associated stringers 72 are assembled, and at 128, the assembled lower skin section 54 and stringers 72 are co-cured. Then, at step 130, the frames 74 and any other mechanically fastened components, such as skin cutout reinforcement parts, are attached, using fasteners or other suitable means, to the assembly of the lower skin section 54 and the stringers 72. The upper and lower barrel sections 48, 50 having been assembled and cured, then, at step 132, a suitable bonding adhesive is applied to the mating surfaces of the splice joint 56. Specifically, the bonding adhesive may be applied to the opposing bond surfaces 90 (FIG. 6C) of the tapered edges 52a, 54a of the splice joint 56. At 134, the upper and lower barrel sections 48, 50 are located in a suitable assembly fixture, where the tapered skin edges are aligned with each other in overlapping relationship, as shown in FIG. 6. It should be noted here that step 132 involving the application of the adhesive to the joint surfaces may be performed after the upper and lower barrel halves have been located in the splice assembly fixture in step 134.

At 136, the upper and lower barrel sections 48, 50 are joined together in a secondary bonding operation which may be carried out, for example and without limitation, within an autoclave where the bonding adhesive is cured, thereby bonding the barrel sections together within the window belt 58. Out-of-autoclave curing of the bonding adhesive may also be possible. At step 138, window openings 70a may be cutout in the upper and lower skin sections 52, 54, in preparation for installation of the window frames 80. Then at step 140, frame splice segments and frame splices 82, 84 respectively, are installed in order to connect the frame sections 74 of the upper and lower barrel sections.

Figure 16:
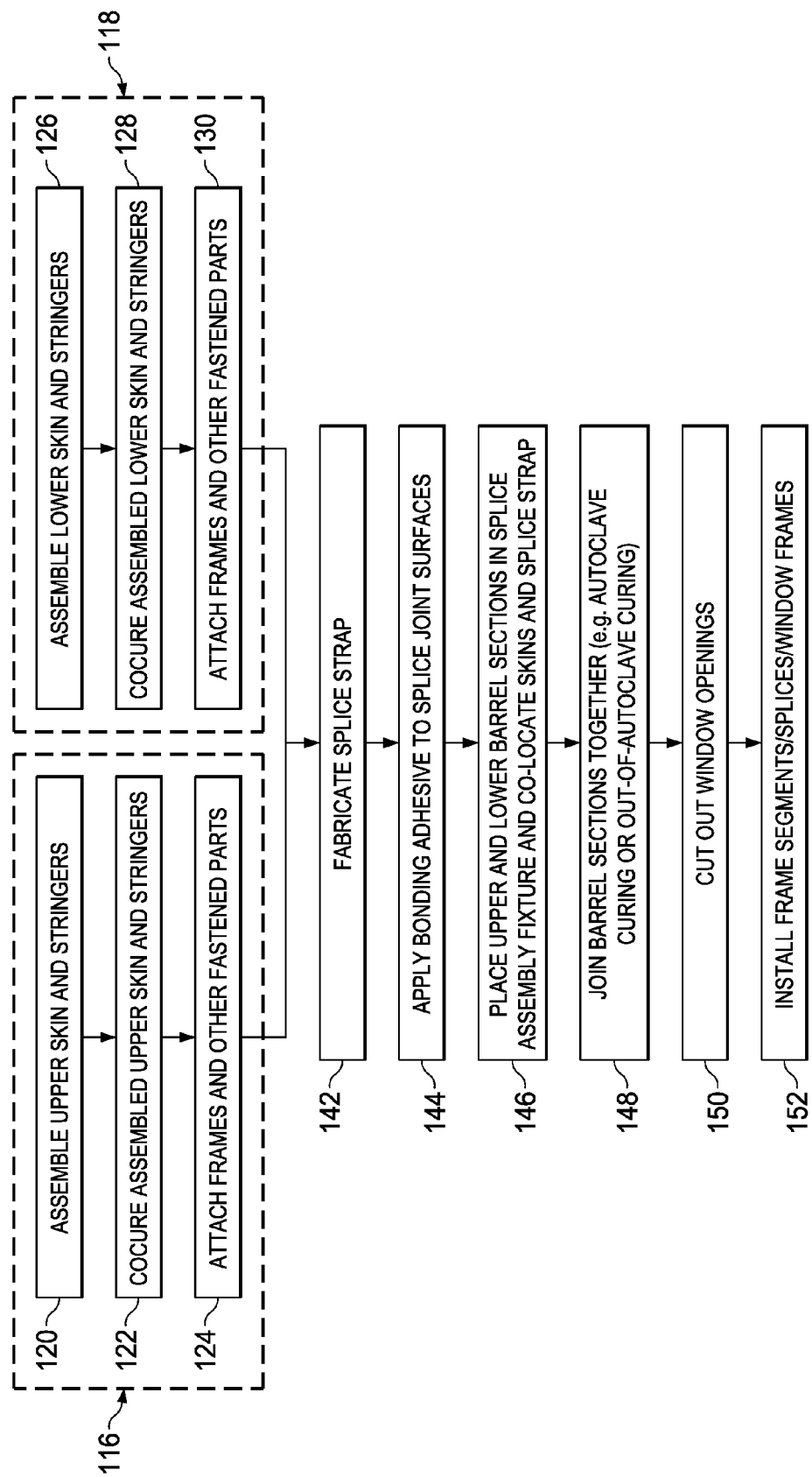
FIG. 16 is an illustration of a flow diagram of a method of fabricating a fuselage barrel assembly using an alternate form of a bonded splice joint.

FIG. 16 illustrates the overall steps of a method of fabricating a barrel assembly 45 using a splice joint 56 employing the bonded splice strap 92 previously discussed in connection with FIGS. 7 and 7A. The upper and lower barrel assemblies 48, 50 are assembled in a sequence of steps shown at 116, 118, similar to the method previously described in connection with FIG. 15. At step 142, the splice strap 92 is fabricated, and at 144 a suitable bonding adhesive is applied to the splice joint surfaces, including the splice strap 92. At 146, the upper and lower barrel sections 48, 50 are placed in an assembly fixture, and the edges of the upper and lower skin sections 52, 54 are co-located with those of the splice strap 92. At 148, the barrel sections 48, 50 are joined together using the splice strap 92, in a secondary bonding operation in which the green splice strap 92 along with the bonding adhesive is cured, for example in an autoclave, although out-of-autoclave curing may also be possible. At step 150, window cutout openings 70a may be formed in the upper and lower skin sections 52, 54, following which at 152 the frame splice segments 82 and frame splices 84 are installed to connect the frame sections 74, and the window frames are installed.

Figure 17:
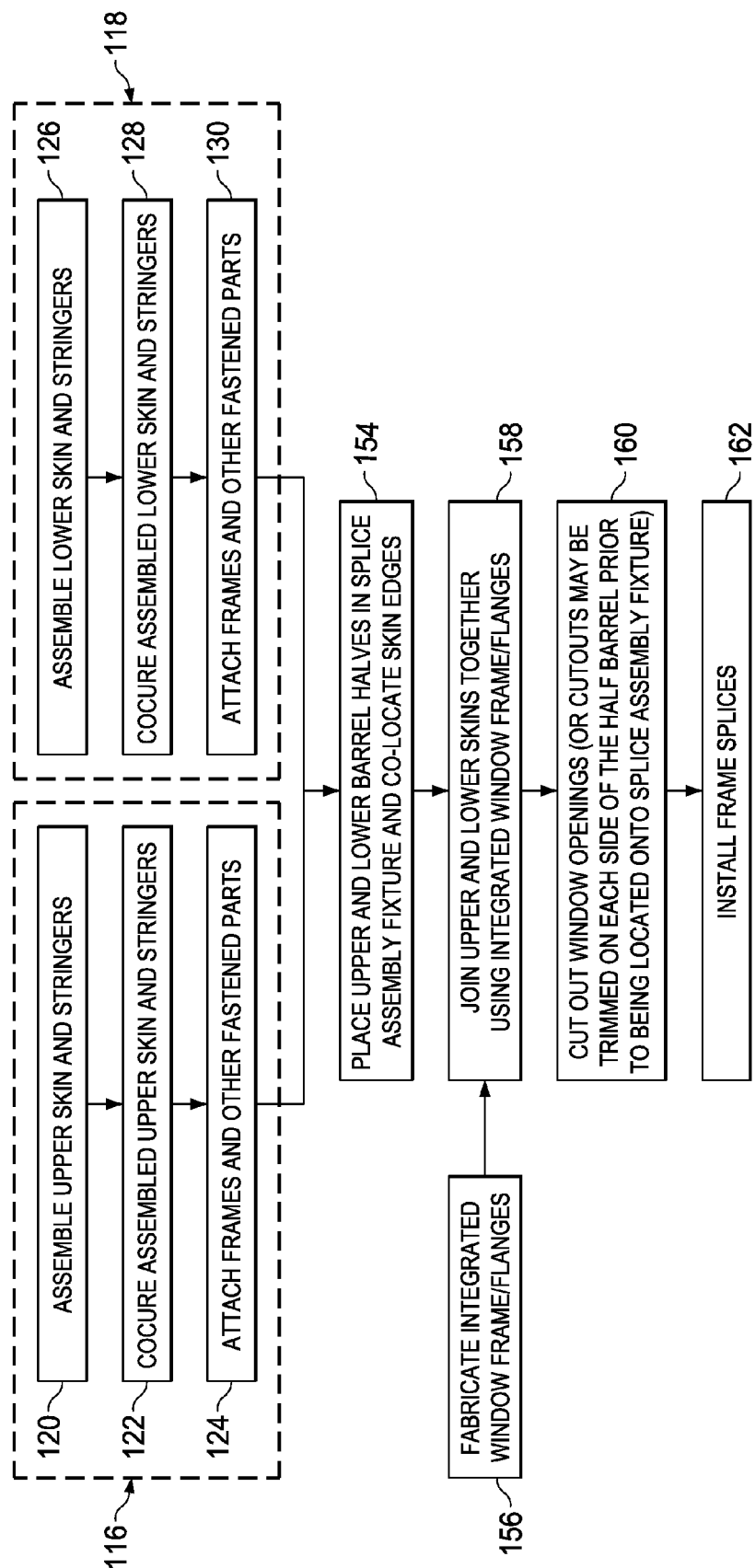
FIG. 17 is an illustration of a flow diagram of a method of fabricating a fuselage barrel assembly employing one form of a mechanically fastened splice joint.

FIG. 17 broadly illustrates the steps of a method of fabricating the barrel assembly 45, in which the splice joint 56 is formed using mechanical fasteners and internal window frames 80 having splice plate portions 80b previously described in connection with FIGS. 8-10. In this embodiment, the upper and lower barrel sections 48, 50 are concurrently assembled in the sequences 116, 118 similar to those shown in FIGS. 15 and 16. At 154, the upper and lower barrel sections 48, 50 are placed in a suitable splice assembly fixture in which the edges of the upper and lower skin sections 52, 54 are co-located relative to each other. At 156, the window frames 80 having splice plate portions 80b are fabricated. At 158, the upper and lower barrel sections 48, 50 are joined together, as illustrated in FIGS. 8-10. At 160, the window openings 70a may be cutout in the upper and lower skin sections 52, 54. Alternatively, the window openings 70a may be formed prior to step 154 by trimming each side of the barrel sections 48, 50 before they are placed in the splice assembly fixture. Finally, at 162, the frame splices 98 are installed which connect the frame sections 74.

Figure 18:
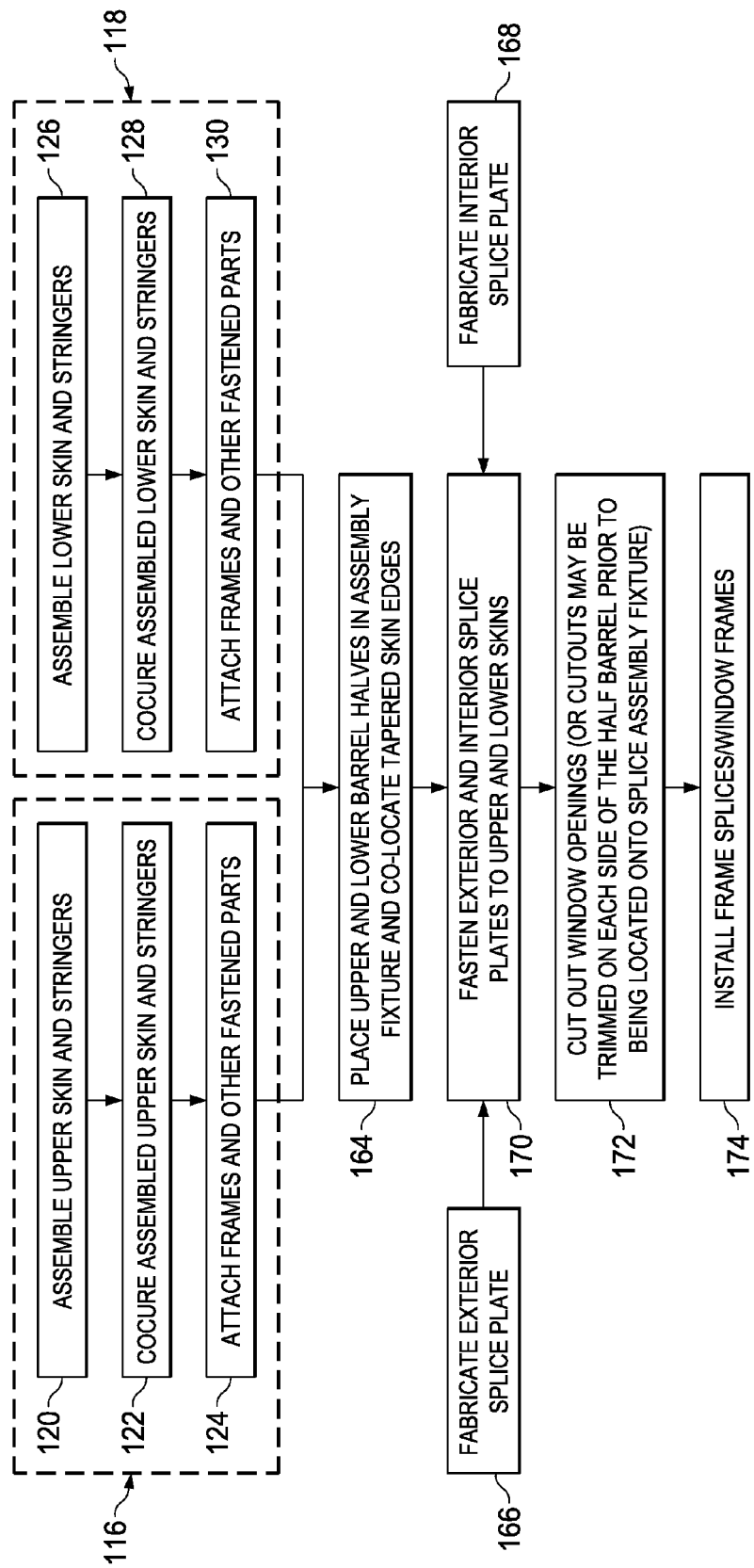
FIG. 18 is an illustration of a flow diagram of a method of fabricating a fuselage barrel assembly using an alternate form of a mechanically fastened splice joint.

FIG. 18 illustrates the overall steps of a method of fabricating the barrel assembly 45 using a mechanical splice joint 56 of the type previously described in connection with FIGS. 11-14 that employs external and internal splice plates 100, 108 respectively. The upper and lower barrel sections 48, 50 are assembled at 116, 118 as in the methods previously described. At 164, the upper and lower barrel sections 48, 50 are placed in an assembly fixture and the tapered edges of the upper and lower skin sections 52, 54 are co-located. At 166, exterior splice plate 100 is fabricated and at step 168 the interior splice plates 108 are fabricated. At 170, the exterior and interior splice plates 108, 100 are used to join the skin sections 52, 54. At 172, the window openings 70a may be cutout in the upper and lower skins 52, 54. Alternatively, the window openings 70a may be formed prior to step 164 by trimming each side of the barrel sections 48, 50 before they are placed in the assembly fixture. Finally, at 174, the frame splices 98 are installed which connect the frame sections 74.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fuselage, comprising:
a composite skin including upper and lower composite skin sections;
a window belt in the composite skin, the window belt including at least one window opening in the composite skin; and
a longitudinal splice joint along the window belt joining the upper and lower skins sections together at the window belt.

2. The fuselage of claim 1, wherein the splice joint includes an adhesive bond between the upper and lower skin sections.

3. The fuselage of claim 2, wherein each of the upper and lower skin sections include laminated resin plies with ply drop-offs each forming bonding surfaces along the splice joint.

4. The fuselage of claim 1, wherein the upper and lower skin sections have overlapping tapered edges joined together along the splice joint.

5. The fuselage of claim 1, wherein the splice joint includes a composite splice strap bonded to each of the upper and lower skin sections.

6. The fuselage of claim 1, wherein:
the composite skin includes an area of increased thickness within the window belt, and
the splice joint is located within the area of increased thickness of the skin.

7. The fuselage of claim 6, wherein the window is located in within the area of increased thickness of the skin.

8. The fuselage of claim 1, wherein each of the upper and lower skin sections is a half barrel.

9. The fuselage of claim 1, further comprising:
first and second longitudinally extending stringers attached to the composite skin, wherein the splice joint and the window are located between the first and second stringers.

10. The fuselage of claim 1, wherein:
the splice joint has a height, and
the window has a height greater than the height of the splice joint.

11. The fuselage of claim 1, wherein the splice joint includes at least a first splice plate fastened to the upper and lower skin sections.

12. The fuselage of claim 11, wherein:
the upper and lower skin sections include inside surfaces and outside surfaces, and
the first splice plate is fastened to the upper and lower skin sections by mechanical fasteners, the first splice plate being located inside the fuselage and engaging the inside surfaces of the upper and lower skin sections.

13. The fuselage of claim 11, wherein:
the splice joint includes a second splice plate attached to the upper and lower skins sections, and
the first splice plate is an internal splice plate and the second splice plate is an external splice plate.

14. The fuselage of claim 13, wherein:
the upper and lower skin sections each include stepped edges forming a longitudinally extending recess in the upper and lower skins, and
the second splice plate is located within the recess.

15. The fuselage of claim 1, wherein the splice joint includes:
a window frame substantially surrounding the window opening and attached to the upper and lower skin sections, and
the window frame includes splice plate portions extending longitudinally along the window belt and fastened to the upper and lower skin sections.

16. The fuselage of claim 15, wherein:
the upper and lower skin sections include adjacent interior surfaces extending longitudinally along a joint line, and
the splice plate portions are attached to the adjacent inside surfaces and span the joint line.

17. The fuselage of claim 1, wherein:
the window belt includes a longitudinal centerline,
each of the upper and lower skin sections is a barrel half, and
the splice joint joins the barrel halves along a centerline of the window belt.

18. A fuselage barrel assembly, comprising:
upper and lower fuselage barrel halves respectively including upper and lower composite skin sections forming a fuselage skin;
window belts in the composite skin respectively on each side of the upper and lower fuselage barrel halves, the composite skin having an increased thickness within the window belts;
window openings in the fuselage skin along each of the window belts; and
splice joints between joining the upper and lower skin sections respectively extending longitudinally along at the window belts.

19. The fuselage barrel assembly of claim 18, wherein:
the upper and lower composite skin sections include tapered overlapping edges, and
each of the splice joints includes a bond between the tapered overlapping edges.

20. The fuselage barrel assembly of claim 19, wherein each of the tapered overlapping edges includes fiber reinforced composite resin ply steps forming bonding surfaces.

21. The fuselage barrel assembly of claim 18, wherein:
the upper and lower composite skin sections include tapered edges along the splice joints, and
each of the splice joints includes a tapered splice strap bonded to the tapered edges of the upper and lower skin sections.

22. The fuselage barrel assembly of claim 18, wherein each of the splice joints includes first and second splice plates respectively fastened to interior and exterior sides of the upper and lower composite skin sections.

23. The fuselage barrel assembly of claim 18, wherein each of the splice joints includes:
window frames respectively extending around the window openings and attached to each of the upper and lower skin sections, and
each of the window frames including longitudinally extending splice plate portions overlying and attached to each of the upper and lower composite skin sections.

24. A method of making a fuselage barrel assembly having windows located along longitudinal window belts, comprising:
fabricating an upper barrel half having an upper composite skin;
fabricating a lower barrel half having a lower composite skin; and
joining the upper and lower barrel halves, including splicing the upper and lower composite skins together along at the window belts.

25. The method of claim 24, further comprising:
forming ply pad-ups in the upper and lower composite skins along the window belts; and forming window openings in the upper and lower composite skins within the ply pad-ups.

26. The method of claim 24, wherein fabricating the upper and lower barrel halves includes fabricating each of the upper and lower composite skins by laminating plies of fiber reinforced resin, and increasing the thickness of the laminated plies in the area of the window belts, and wherein splicing the upper and lower composite skins together is performed within the area having the increased thickness of the laminated plies.

27. The method of claim 24, wherein splicing the upper and lower composite skins together includes:

overlapping edges of the upper and lower composite skins, and adhesively bonding the overlapping edges together.

28. The method of claim 24, wherein splicing the upper and lower composite skins together includes:

bringing edges of the upper and lower composite skins together, and co-curing to the upper and lower composite skins.

29. The method of claim 24, wherein splicing the upper and lower composite skins together includes bonding a composite splice strap to adjacent edges of the upper and lower composite skins.

30. The method of claim 24, wherein splicing the upper and lower composite skins together includes fastening the upper and lower composite skins between external and internal splice plates.

31. The method of claim 30, wherein:

fabricating each of the upper and lower barrel halves includes forming external longitudinal recesses in the upper and lower composite skins, and fastening the upper and lower skins between the external and internal spice plates includes locating the external splice plate within the recesses.

32. The method of claim 24, further comprising:

fabricating a plurality of window frames, and wherein splicing the upper and lower composite skins together includes mechanically connecting the upper and lower composite skins together by fastening the window frames to each of the upper and lower composite skins.

33. A method of making a fuselage barrel having windows located along longitudinal window belts, comprising:

fabricating a laminated composite fuselage skin, including fabricating upper and lower composite skin sections and forming ply pad-ups along edges of the upper and lower skin sections to increase the thickness of the fuselage skin along the window belts; and assembling the upper and lower composite skin sections together, including forming longitudinal splice joints between the upper and lower skin sections at section within the ply pad-ups.

34. The method of claim 33, further comprising:

forming window cutouts in the fuselage skin within the ply pad-ups.

35. The method of claim 34, wherein the window cutouts are formed in the upper and lower skin sections before the upper and lower skin sections are assembled together.

36. The method of claim 34, wherein forming the splice joints includes:

installing window frames in the window cutouts, and fastening the window frames to each of the upper and lower skin sections.

37. The method of claim 33, wherein forming the longitudinal splice joints includes joining the upper and lower skin sections by one of:

bonding, and cc-curing.

38. The method of claim 33, wherein forming the longitudinal splice joints includes:

fastening splice plates to each of the upper and lower skin sections.

39. A method of making a fuselage barrel assembly having a window belt, comprising:

fabricating an upper barrel half having an upper composite skin;

fabricating a lower barrel half having a lower composite skin;

placing each of the upper and lower barrel halves in a splice assembly feature, including co-locating edges of the upper and lower skins; and splicing together the edges of the upper and lower skins at the window belt.

40. The method of claim 39, wherein splicing the edges of the upper and lower skins is performed by adhesively bonding the edges together.

41. The method of claim 39, wherein splicing the edges of the upper and lower skins is performed by co-curing the upper and lower skins.

42. The method of claim 39, wherein splicing the edges of the upper and lower skins is performed by fastening splice plates between the upper and lower skins.

43. The method of claim 39, wherein splicing the edges includes overlapping and joining the edges of the upper and lower skins.

44. The method of claim 39, further comprising:

forming window cutouts in each of the upper and lower skins, and wherein splicing the upper and lower skins together includes placing window frames in the window cutouts and fastening each of the window frames to each of the upper and lower skins.

45. The method of claim 39, wherein:

fabricating the upper and lower barrel halves includes forming a longitudinal recess in the edges of the upper and lower skins, and splicing the edges together includes placing a splice plate in the recess and fastening the splice plate to each of the upper and lower skins.

* * * * *